United States Patent
Kato et al.

(10) Patent No.: US 7,173,893 B2
(45) Date of Patent: Feb. 6, 2007

(54) OPTICAL RECORDING MEDIUM, METHOD OF RECORDING INFORMATION TO AN OPTICAL RECORDING MEDIUM, AND INFORMATION RECORDING APPARATUS

(75) Inventors: Tatsuya Kato, Tokyo (JP); Hiroshi Shingai, Tokyo (JP); Hideki Hirata, Tokyo (JP)

(73) Assignee: TDK Corporation, Tokyo (JP)

( * ) Notice: Subject to any disclaimer, the term of this patent is extended or adjusted under 35 U.S.C. 154(b) by 499 days.

(21) Appl. No.: 10/489,050

(22) PCT Filed: Sep. 5, 2002

(86) PCT No.: PCT/JP02/09069

§ 371 (c)(1),
(2), (4) Date: Mar. 9, 2004

(87) PCT Pub. No.: WO03/025915

PCT Pub. Date: Mar. 27, 2003

(65) Prior Publication Data

US 2004/0240361 A1 Dec. 2, 2004

(30) Foreign Application Priority Data

Sep. 11, 2001 (JP) .......................... 2001-275516
Sep. 11, 2001 (JP) .......................... 2001-275522

(51) Int. Cl.
*G11B 5/09* (2006.01)
*G11B 7/00* (2006.01)
(52) U.S. Cl. ................ 369/59.11; 369/59.1; 369/47.5; 369/116

(58) Field of Classification Search ............... None
See application file for complete search history.

(56) References Cited

U.S. PATENT DOCUMENTS 6,256,277 B1 * 7/2001 Saga et al. ............... 369/59.24

FOREIGN PATENT DOCUMENTS

| JP | 8287465 | 11/1996 |
|---|---|---|
| JP | 9134525 | 5/1997 |
| JP | 10083573 | 3/1998 |
| JP | 2001-331936 | 11/2001 |

* cited by examiner

*Primary Examiner*—Muhammad Edun
(74) *Attorney, Agent, or Firm*—Seed IP Law Group PLLC

(57) ABSTRACT

It is an object of the present invention to provide a method of recording information to an optical recording medium that is suited to achieving high data transfer rates.

The optical recording medium according to the present invention comprises a method of recording information to an optical recording medium where information is recorded by forming on the optical recording medium a plurality of recording marks selected from a group consisting of several types of recording marks each with different lengths, wherein a first recording mark and a second recording mark contained within said group are formed with the number of pulses and the pulse spacing in the laser beam set substantially equal to each other. Thus, even in the case that one clock period (T) is shortened to achieve high transfer rates, recording marks with good shapes can be formed. In addition, control is simplified and it is possible to reduce the cost of a drive to which the present invention is applied.

39 Claims, 10 Drawing Sheets

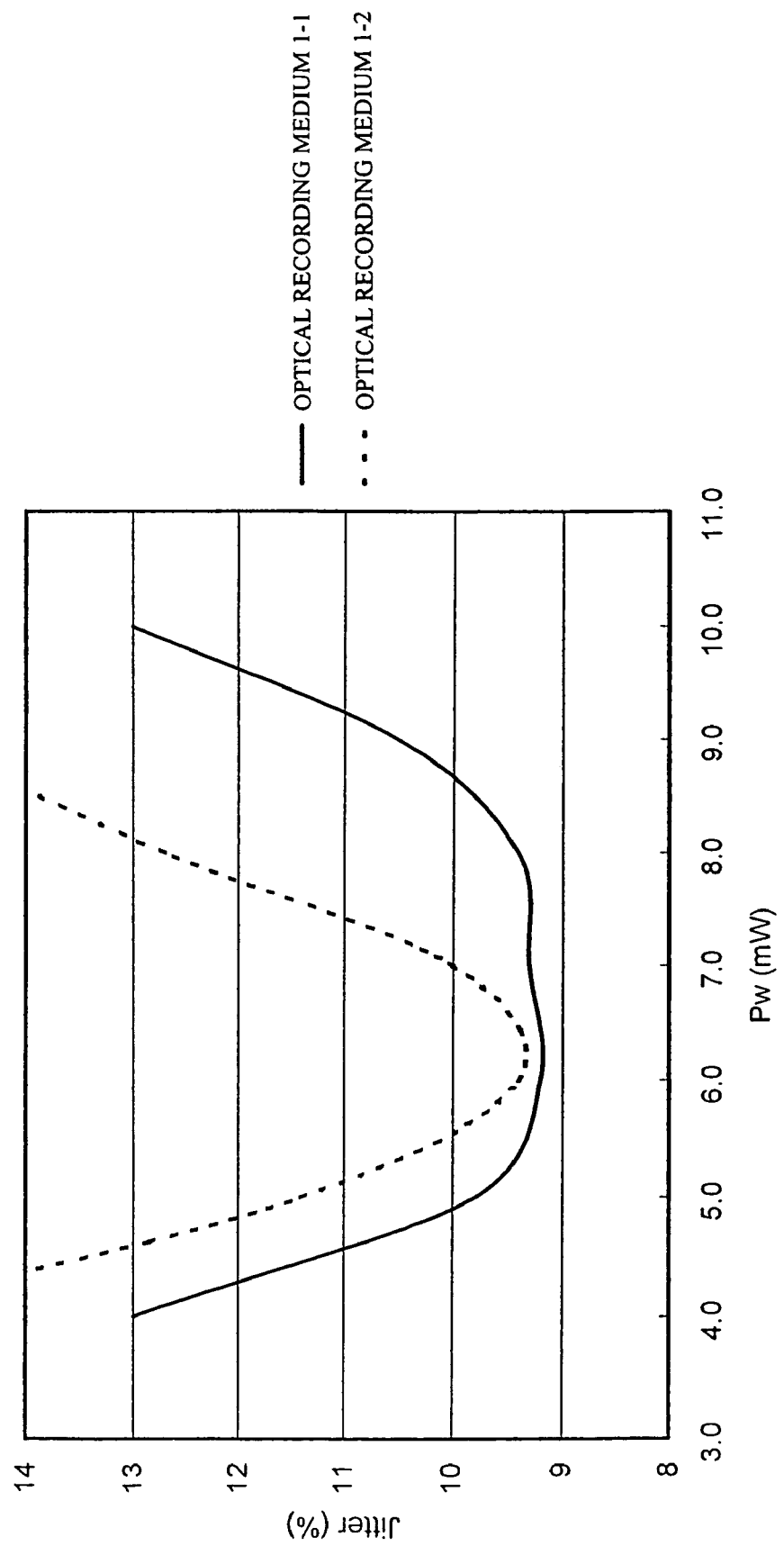

OPTICAL RECORDING MEDIUM, METHOD OF RECORDING INFORMATION TO AN OPTICAL RECORDING MEDIUM, AND INFORMATION RECORDING APPARATUS

BACKGROUND OF THE INVENTION

The present invention relates to an optical recording medium, a method of recording information to an optical recording medium and an information recording apparatus, and particularly to an optical recording medium, a method of recording information to an optical recording medium and an information recording apparatus that is suited to achieving high data transfer rates.

DESCRIPTION OF THE PRIOR ART

Optical recording media typified by the CD and the DVD have been widely used as recording media for recording digital data, and a widely used data recording format is a format wherein the lengths of recording marks along the track are modulated depending on the data to be recorded.

When such a recording format is used, while reading data, a laser beam set to the playback power level is shined along the tracks of the optical recording medium and the reflected light is detected to read the information contained in the recording marks. In addition, while writing data, a laser beam set to the recording power level is shined along the tracks of the optical recording medium to form recording marks having the stipulated lengths. For example, in a DVD-RW which is one type of optical recording medium whose data is user-rewritable, recording marks of lengths corresponding to 3T to 11T (where T is one clock cycle) are used to perform the recording of data.

Here, at the time of recording data to optical recording media, rather than illuminating the optical recording medium with a laser beam having the same pulse width as the time corresponding to the length of the recording marks, typically a laser beam consisting of a number of pulse trains determined based on the type of recording mark to be formed is shined onto the optical recording medium to form recording marks of the stipulated length. For example, when recording data onto a DVD-RW as described above, a number of pulses equal to n−1 or n−2 (where n is the type of recording mark, taking a value of either 3 to 11 or 14) is continuously shined, and thus one of the recording marks having a length corresponding to 3T to 11T or 14T is formed. Accordingly, in the case of n−2, one pulse is used to form a recording mark with a length corresponding to 3T, while nine pulses are used to form a recording mark with a length corresponding to 11T. In addition, in the case of n−1, two pulses are used to form a recording mark with a length corresponding to 3T, while ten pulses are used to form a recording mark with a length corresponding to 11T.

In recent years, it has become strongly desirable to achieve further increases in the data transfer rate with respect to optical recording media and in order to achieve this, it is effective to increase the linear velocity in recording/playback and to this end the clock frequency must be increased.

However, increasing the clock frequency makes the period of one clock pulse (T) shorter, so the time to form each recording mark decreases proportionally and when the laser beam is modulated to pulse trains as described above, the time equivalent to the width of each pulse making up the pulse train becomes very short.

On the other hand, the laser driver requires a certain amount of time from when the drive current is applied until the light emission intensity reaches the intensity correspond to that current value. Accordingly, even if one attempts to shine the laser beam for an extremely short time in order to increase the data transfer rate, the laser beam intensity corresponding to each pulse will attenuate before reaching the stipulated value. In other words, a laser beam intensity corresponding closely to the pulse train pattern is not obtained. As a result, the recording layer on which recording marks are formed is inadequately heated so the shape of the recording marks may be distorted or small, or the output of the playback may be small or jitter may become large.

In particular, in order to achieve a data transfer rate of 100–200 Mbps when the format efficiency is 80%, it is necessary to increase the clock frequency to approximately 188–375 MHz and in this case, one clock period (T) becomes approximately 5.3–2.6 ns. If one clock period (T) is shortened to 6 ns or less in this manner, it is extremely difficult to form recording marks with a good shape by conventional methods.

SUMMARY OF THE INVENTION

Accordingly, an object of the present invention is to provide an improved method of recording information to an optical recording medium and an improved information recording apparatus.

In addition, another object of the present invention is to provide a method of recording information to an optical recording medium and an information recording apparatus that are suited to achieving high data transfer rates.

In addition, a still other object of the present invention is to provide an optical recording medium that can be recorded at high data transfer rates.

In addition, a still other object of the present invention is to provide a method of recording information to an optical recording medium and an information recording apparatus that is suited to achieving data transfer rates of 100–200 Mbps.

These objects of the present invention are achieved by an optical recording medium where information is recorded by forming a plurality of recording marks selected from a group consisting of several types of recording marks each with different lengths, wherein: the optical recording medium comprises setting information required to perform the recording of a first recording mark and a second recording mark contained within said group with the number of pulses and the pulse spacing in the laser beam set substantially equal to each other.

With the present invention, two recording marks of lengths different from each other are formed using a laser beam consisting of the same number of pulses, so even if the clock period (T) is shortened in order to achieve high data transfer rates, the overall number of pulses in the laser beam shined in order to form a single recording mark becomes fewer than in the prior art, so recording marks with a good shape can be formed. In addition, the pulse spacing is set substantially equal in the formation of the first and second recording marks, so control is simplified and thus it is possible to reduce the cost of a drive according to the present invention used to record data on an optical recording medium, and also recording marks with a good shape can be formed.

These objects of the present invention are also achieved by an optical recording medium where information is recorded by forming a plurality of recording marks selected from a group consisting of several types of recording marks each with different lengths, wherein: the optical recording medium comprises setting information required to form a first recording mark and a second recording mark contained within said group using a laser beam consisting of the same number of pulses, and to set the cooling interval substantially constant in the formation of all recording marks contained within said group.

With the present invention, the cooling interval is set substantially constant in the formation of all recording marks, so control is simplified and thus it is possible to reduce the cost of a drive according to the present invention used to record data on an optical recording medium.

These objects of the present invention are also achieved by an optical recording medium where information is recorded by forming a plurality of recording marks selected from a group consisting of several types of recording marks each with different lengths, wherein: in the case that a first recording mark contained within said group and a second recording mark contained within said group are recording marks that have lengths adjacent to each other within said group, and said second recording mark and a third recording mark contained within said group are recording marks that have lengths adjacent to each other within said group, the optical recording medium comprises setting information required to make the pulse width of the first pulse of the laser beam used to form said first recording mark, the pulse width of the first pulse of the laser beam used to form said second recording mark, and the pulse width of the first pulse of the laser beam used to form said third recording mark different from each other.

In this specification, the statement that a first recording mark and a second recording mark contained within a group consisting of several types of recording marks each with different lengths have lengths adjacent to each other within said group means that the first recording mark contained within said group has a length of nT and the second recording mark contained within said group has a length of (n+1)T where T is the reference clock period and n is an integer equal to or larger than 2 and equal to or smaller than 7, or that the first recording mark contained within said group has a length of (n+1)T and the second recording mark contained within said group has a length of nT.

With the present invention, the pulse width of the first pulse of the laser beam used to form three recording marks of lengths different from each other are made different, so the amount of energy applied to the optical recording medium can be controlled in a more detailed fashion than in the prior art, and thus it is easy to form recording marks of desired lengths.

These objects of the present invention are also achieved by an optical recording medium where information is recorded by forming a plurality of recording marks selected from a group consisting of several types of recording marks each with different lengths, wherein: the optical recording medium comprises setting information required to make the pulse width of the first pulse of the laser beam used to form said first recording mark, and the pulse width of the first pulse of the laser beam used to form said second recording mark different from each other, and to set the cooling interval for forming said first recording mark and the cooling interval for forming said second recording mark substantially equal to each other.

With the present invention, control is simplified and thus it is possible to reduce the cost of a drive according to the present invention used to record data on an optical recording medium.

These objects of the present invention are also achieved by an optical recording medium where information is recorded by forming a plurality of recording marks selected from a group consisting of several types of recording marks each with different lengths, wherein: the optical recording medium comprises setting information required to make the pulse width of the last pulse of the laser beam used to form each of the recording marks contained in said group each different from the pulse width of the last pulse of the laser beam used to form recording marks that have lengths adjacent to each other within said group.

With the present invention, the pulse width of the last pulse of the laser beam used to form each of the recording marks is made different from the pulse width of the last pulse of the laser beam used to form the recording marks that have lengths adjacent to each other, so the amount of energy applied to the optical recording medium can be controlled in a more detailed fashion than in the prior art, and thus it is easy to form recording marks of desired lengths.

These objects of the present invention are also achieved by a method of recording information to an optical recording medium where information is recorded by forming on the optical recording medium a plurality of recording marks selected from a group consisting of several types of recording marks each with different lengths, wherein: the method of recording information to an optical recording medium comprises a step of forming a first recording mark and a second recording mark contained within said group with the number of pulses and the pulse spacing in the laser beam set substantially equal to each other.

With the present invention, two recording marks of lengths different from each other are formed using a laser beam consisting of the same number of pulses, so even if the clock period (T) is shortened in order to achieve high is data transfer rates, recording marks with a good shape can be formed. In addition, the pulse spacing is set substantially equal in the formation of the first and second recording marks, so control is simplified and thus it is possible to reduce the cost of a drive to which the present invention applies, and also recording marks with a good shape can be formed.

In a preferred embodiment of the present invention, said first recording mark and said second recording mark are recording marks that have lengths adjacent to each other within said group.

In a further preferred embodiment of the present invention, the difference in length between said first recording mark and said second recording mark corresponds to the clock period.

In a further preferred embodiment of the present invention, said number of pulses is 2.

A further preferred embodiment of the present invention comprises a step of forming a third recording mark and a fourth recording mark contained within said group using a laser beam consisting of a number of pulses that is different from said number of pulses, being a number of pulses that is same as each other, with the pulse spacing in each set substantially equal to the pulse spacing at the time of formation of said first and second recording marks.

In a further preferred embodiment of the present invention, said number of pulses is 3.

In a further preferred embodiment of the present invention, said second recording mark and said third recording mark are recording marks that have lengths adjacent to each other within said group.

In a further preferred embodiment of the present invention, the pulse spacing is set to essentially constant in the formation of all recording marks in which a number of pulses equal to 2 or more is used.

With these preferred embodiments of the present invention, control is simplified and thus it is possible to reduce the cost of a drive to which the present invention applies, and also recording marks with a good shape can be formed.

In a further preferred embodiment of the present invention, the cooling interval is set to essentially constant in the formation of all recording marks.

With these further preferred embodiments of the present invention, control is even more simplified and thus it is possible to even further reduce the cost of a drive to which the present invention applies, and also recording marks with an even better shape can be formed.

In a further preferred embodiment of the present invention, the recording linear velocity of said laser beam is 16 m/s or greater.

In a further preferred embodiment of the present invention, said clock period is 6 ns or less.

These objects of the present invention are also achieved by a method of recording information to an optical recording medium where information is recorded by forming on the optical recording medium a plurality of recording marks selected from a group consisting of several types of recording marks each with different lengths, wherein: the method of recording information to an optical recording medium comprises a step of forming a first recording mark and a second recording mark contained within said group using a laser beam consisting of the same number of pulses, and a step of setting the cooling interval substantially constant in the formation of all recording marks contained within said group.

With the present invention, control is simplified and thus it is possible to reduce the cost of a drive to which the present invention applies, and also recording marks with a good shape can be formed.

These objects of the present invention are also achieved by a method of recording information to an optical recording medium where information is recorded by forming on the optical recording medium a plurality of recording marks selected from a group consisting of several types of recording marks each with different lengths, wherein: the method of recording information to an optical recording medium is such that the pulse width of the first pulse of the laser beam used to form a first recording mark contained within said group, the pulse width of the first pulse of the laser beam used to form a second recording mark contained within said group, and the pulse width of the first pulse of the laser beam used to form a third recording mark contained within said group are different from each other, and moreover, said first recording mark and said second recording mark are recording marks that have lengths adjacent to each other within said group, and said second recording mark and said third recording mark are recording marks that have lengths adjacent to each other within said group.

With the present invention, the pulse width of the first pulse of the laser beam used to form three recording marks of lengths different from each other is made different, so the energy applied to the optical recording medium can be controlled in a more detailed fashion than in the prior art, and thus it is easy to form recording marks of desired lengths.

In a preferred embodiment of the present invention, the number of pulses in said laser beam used to form said first recording mark and the number of pulses in said laser beam used to form said second recording mark are equal to each other.

In a further preferred embodiment of the present invention, the number of pulses in said laser beam used to form said second recording mark and the number of pulses in said laser beam used to form said third recording mark are different from each other.

These objects of the present invention are also achieved by a method of recording information to an optical recording medium where information is recorded by forming on the optical recording medium a plurality of recording marks selected from a group consisting of several types of recording marks each with different lengths, wherein: the method of recording information to an optical recording medium is such that the pulse width of the first pulse of the laser beam used to form a first recording mark contained within said group, and the pulse width of the first pulse of the laser beam used to form a second recording mark contained within said group are different from each other, and, the cooling interval for forming said first recording mark and the cooling interval for forming said second recording mark are substantially equal to each other.

With the present invention, control is simplified and thus it is possible to reduce the cost of a drive to which the present invention applies, and also recording marks with a good shape can be formed.

In a preferred embodiment of the present invention, the number of pulses in said laser beam used to form said first recording mark and the number of pulses in said laser beam used to form said second recording mark are different from each other.

These objects of the present invention are also achieved by a method of recording information to an optical recording medium where information is recorded by forming on the optical recording medium a plurality of recording marks selected from a group consisting of several types of recording marks each with different lengths, wherein: the method of recording information to an optical recording medium is such that the pulse width of the last pulse of the laser beam used to form each of the recording marks contained in said group is each different from the pulse width of the last pulse of the laser beam used to form recording marks that have lengths adjacent to each other within said group.

With the present invention, the pulse width of the last pulse of the laser beam used to form each of the recording marks is made different from the pulse width of the last pulse of the laser beam used to form recording marks that have lengths adjacent to each other, so the energy applied to the optical recording medium can be controlled in a more detailed fashion than in the prior art, and thus it is easy to form recording marks of desired lengths.

In a preferred embodiment of the present invention, the cooling interval is set substantially constant in the formation of all recording marks contained within said group.

In a further preferred embodiment of the present invention, the pulse spacing is set to essentially constant in the formation of all recording marks in which a number of pulses equal to 2 or more is used.

These objects of the present invention are also achieved by an information recording apparatus that records information by forming on an optical recording medium a plurality of recording marks selected from a group consisting of several types of recording marks each with different lengths, wherein: the information recording apparatus comprises means of forming a first recording mark and a second recording mark contained within said group with the number of pulses and the pulse spacing in the laser beam set substantially equal to each other.

These objects of the present invention are also achieved by an optical recording medium where information is recorded by forming a plurality of recording marks selected from a group consisting of several types of recording marks each with different lengths correspond to an integral multiple of a clock period, wherein: the optical recording medium comprises setting information required to form recording marks of a length corresponding to even-number multiples of said clock period using a laser beam consisting of a number of pulses equal to the quotient obtained upon dividing the respective multiples by 2, to form recording marks of a length corresponding to odd-number multiples of said clock period using a laser beam consisting of a number of pulses equal to the quotient obtained upon dividing by 2 a value obtained by adding 1 to, or a value obtained by subtracting 1 from the respective multiples, and moreover, to set the pulse spacing at the time of forming recording marks formed using a stipulated number of pulses substantially equal to the pulse spacing at the time of forming other recording marks formed using said stipulated number of pulses.

With the present invention, the number of pulses used to form each recording mark is reduced, so even if the clock period (T) is shortened in order to achieve high data transfer rates, recording marks with a good shape can be formed. In addition, the pulse spacing is set substantially equal in the formation of two recording marks that use the same number of pulses, so control is simplified and thus it is possible to reduce the cost of a drive to which the present invention applies, and also recording marks with a good shape can be formed.

In a preferred embodiment of the present invention, said information contains information required to set the pulse spacing essentially constant in the formation of all recording marks in which a number of pulses equal to 2 or more is used.

With these preferred embodiments of the present invention, control is simplified and thus it is possible to reduce the cost of a drive to which the present invention applies, and also recording marks with a good shape can be formed.

In a further preferred embodiment of the present invention, said information contains information required to set the cooling interval essentially constant in the formation of all recording marks.

With these further preferred embodiments of the present invention, control is even more simplified and thus it is possible to even further reduce the cost of a drive to which the present invention applies, and also recording marks with an even better shape can be formed.

In a further preferred embodiment of the present invention, said information contains information required to, for recording marks formed using a number of pulses equal to 2 or greater, set the pulse width of the last pulse equal to each other for each recording mark of a length corresponding to even-number multiples of said clock period, and set the pulse width of the last pulse equal to each other for each recording mark of a length corresponding to odd-number multiples of said clock period.

With these further preferred embodiments of the present invention, control is even more simplified and thus it is possible to even further reduce the cost of a drive used to record data to an optical recording medium according to the present invention, and also recording marks with an even better shape can be formed.

These objects of the present invention are achieved by a method of recording information to an optical recording medium where information is recorded by forming on the optical recording medium a plurality of recording marks selected from a group consisting of several types of recording marks each with different lengths corresponding to an integral multiple of a clock period, wherein: the method of recording information to an optical recording medium comprises a step of forming recording marks of a length corresponding to even-number multiples of said clock period using a laser beam consisting of a number of pulses equal to the quotient obtained upon dividing the respective multiples by 2, a step of forming recording marks of a length corresponding to odd-number multiples of said clock period using a laser beam consisting of a number of pulses equal to the quotient obtained upon dividing by 2 a value obtained by adding 1 to, or a value obtained by subtracting 1 from the respective multiples, and moreover, a step of setting the pulse spacing at the time of forming recording marks formed using a stipulated number of pulses substantially equal to the pulse spacing at the time of forming other recording marks formed using said stipulated number of pulses.

With the present invention, the number of pulses used to form each recording mark is reduced, so even if the clock period (T) is shortened in order to achieve high data transfer rates, recording marks with a good shape can be formed. In addition, the pulse spacing is set substantially equal in the formation of two recording marks that use the same number of pulses, so control is simplified and thus it is possible to reduce the cost of a drive to which the present invention applies, and also recording marks with a good shape can be formed.

In a preferred embodiment of the present invention, the pulse spacing is set essentially constant in the formation of all recording marks in which a number of pulses equal to 2 or more is used.

With the present invention, control is simplified and thus it is possible to reduce the cost of a drive to which the present invention applies, and also recording marks with a good shape can be formed.

In a further preferred embodiment of the present invention, the cooling interval is set essentially constant in the formation of all recording marks.

With these further preferred embodiments of the present invention, control is even more simplified and thus it is possible to even further reduce the cost of a drive used to record data to an optical recording medium according to the present invention, and also recording marks with an even better shape can be formed.

In a further preferred embodiment of the present invention, regarding recording marks formed using a number of pulses equal to 2 or greater, the pulse width of the last pulse is set equal to each other for each recording mark of a length corresponding to even-number multiples of said clock period, and the pulse width of the last pulse is set equal to each other for each recording mark of a length corresponding to odd-number multiples of said clock period.

With these further preferred embodiments of the present invention, control is even more simplified and thus it is possible to even further reduce the cost of a drive used to record data to an optical recording medium according to the present invention, and also recording marks with an even better shape can be formed.

In a further preferred embodiment of the present invention, said recording marks are formed with the data transfer rate set to 100–200 Mbps.

In a further preferred embodiment of the present invention, said recording marks are formed with the data transfer rate set to approximately 140 Mbps.

These objects of the present invention are also achieved by a method of recording information to an optical recording medium where information is recorded by forming on the optical recording medium a plurality of recording marks selected from a group consisting of several types of recording marks each with different lengths corresponding to an integral multiple of a clock period, wherein: the method of recording information to an optical recording medium comprises a step of forming recording marks of a length corresponding to even-number multiples of said clock period using a laser beam consisting of a number of pulses equal to the quotient obtained upon dividing the respective multiples by 2, a step of forming recording marks of a length corresponding to odd-number multiples of said clock period using a laser beam consisting of a number of pulses equal to the quotient obtained upon dividing by 2 a value obtained by adding 1 to, or a value obtained by subtracting 1 from the respective multiples, and moreover, a step of setting the cooling interval substantially constant in the formation of all recording marks.

These objects of the present invention are also achieved by a method of recording information to an optical recording medium where information is recorded by forming on the optical recording medium a plurality of recording marks selected from a group consisting of several types of recording marks each with different lengths corresponding to an integral multiple of a clock period, wherein: the method of recording information to an optical recording medium comprises a step of forming recording marks of a length corresponding to even-number multiples of said clock period using a laser beam consisting of a number of pulses equal to the quotient obtained upon dividing the respective multiples by 2, a step of forming recording marks of a length corresponding to odd-number multiples of said clock period using a laser beam consisting of a number of pulses equal to the quotient obtained upon dividing by 2 a value obtained by adding 1 to, or a value obtained by subtracting 1 from the respective multiples, and moreover, a step of, regarding recording marks formed using a number of pulses equal to 2 or greater, setting the pulse width of the last pulse equal to each other for each recording mark of a length corresponding to even-number multiples of said clock period, and setting the pulse width of the last pulse equal to each other for each recording mark of a length corresponding to odd-number multiples of said clock period.

These objects of the present invention are also achieved by an information recording apparatus that records information by forming on the optical recording medium a plurality of recording marks selected from a group consisting of several types of recording marks each with different lengths corresponding to an integral multiple of a clock period, wherein: the information recording apparatus comprises means of forming recording marks of a length corresponding to even-number multiples of said clock period using a laser beam consisting of a number of pulses equal to the quotient obtained upon dividing the respective multiples by 2, means of forming recording marks of a length corresponding to odd-number multiples of said clock period using a laser beam consisting of a number of pulses equal to the quotient obtained upon dividing by 2 a value obtained by adding 1 to, or a value obtained by subtracting 1 from the respective multiples, and moreover, means of setting the pulse spacing at the time of forming recording marks formed using a stipulated number of pulses substantially equal to the pulse spacing at the time of forming other recording marks formed using said stipulated number of pulses.

BRIEF DESCRIPTION OF THE DRAWINGS

FIG. 10 is a graph illustrating the relationship between the recording power $P_w$ and jitter.

DESCRIPTION OF THE PREFERRED EMBODIMENTS

Preferred embodiments of the present invention will be explained in detail with reference to the drawings.

Figure 1:
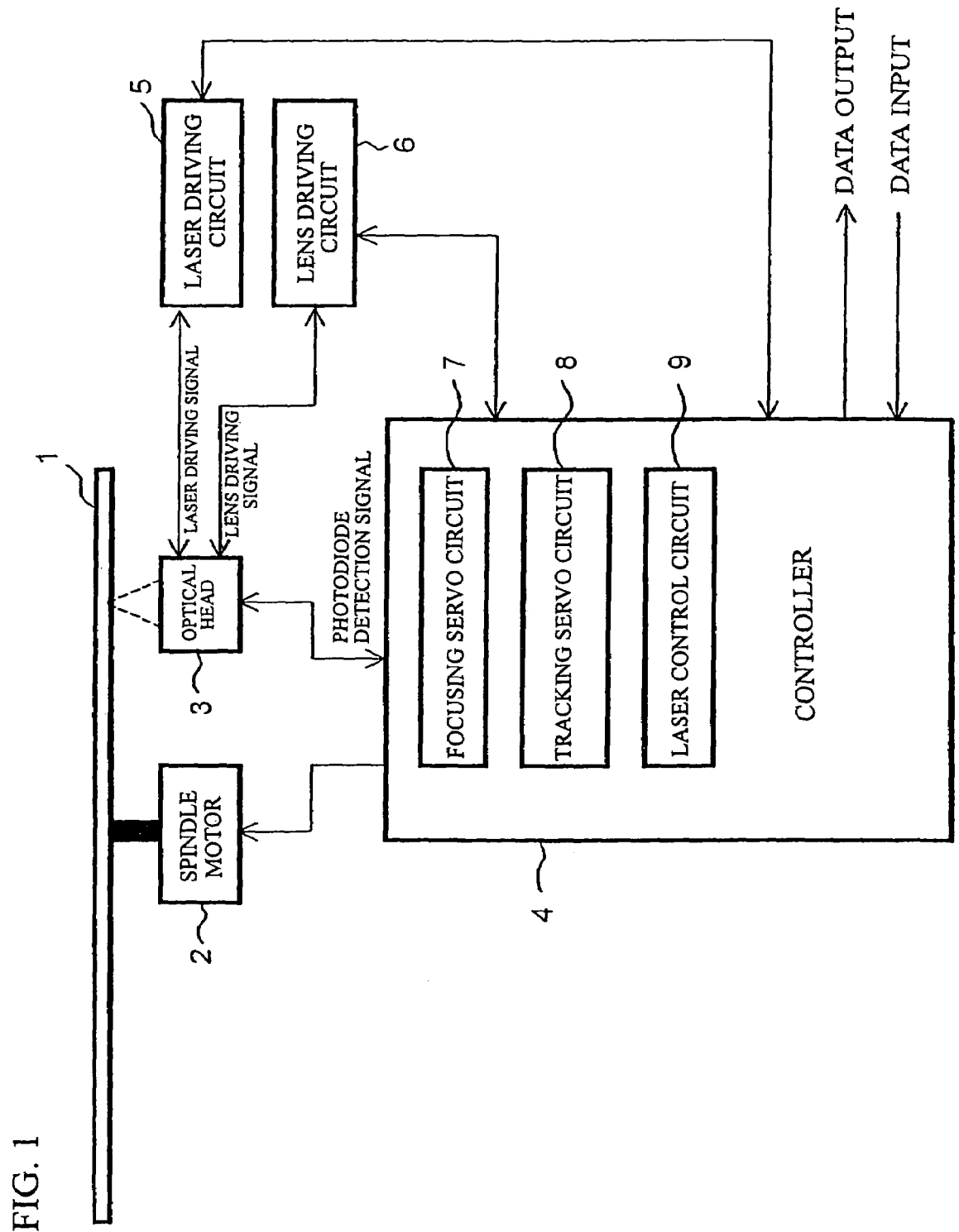
FIG. 1 is a schematic drawing of the major components of an information recording apparatus according to a preferred embodiment of the present invention.

FIG. 1 is a schematic drawing of the major components of an information recording apparatus according to a preferred embodiment of the present invention.

As shown in FIG. 1, the information recording apparatus according to this embodiment is equipped with a spindle motor 2 for rotating an optical recording medium 1, an optical head 3 for shining a laser beam onto the optical recording medium 1, a controller 4 for controlling the operation of the spindle motor 2 and the optical head 3, a laser driving circuit 5 that supplies a laser driving signal to the optical head 3, and a lens driving circuit 6 that supplies a lens driving signal to the optical head 3.

Moreover, as shown in FIG. 1, the controller 4 includes a focusing servo circuit 7, a tracking servo circuit 8, and a laser control circuit 9. When the focusing servo circuit 7 is activated, the focus is aligned to the recording surface of the rotating optical recording medium 1, and when the tracking servo circuit 8 is activated, the spot of the laser beam begins to automatically track the eccentric signal track of the optical recording medium 1. The focusing servo circuit 7 and tracking servo circuit 8 are provided with an auto gain control function for automatically adjusting the focusing gain and an auto gain control function for automatically adjusting the tracking gain, respectively. In addition, the laser control circuit 9 is a circuit that generates the laser driving signal supplied by the laser driving circuit 5, generating an appropriate laser driving signal based on recording condition setting information recorded on the optical recording medium 1. Here, the "recording condition setting information" refers to various conditions required for recording data on the optical recording medium 1, e.g., information used in order to determine the power of the laser beam to be shined while recording, the pulse train pattern to be described later, and the like. The recording condition setting information may include not only various conditions required to record data indicated specifically, but also the recording conditions may be identified by specifying one of several conditions stored in advance within the information recording apparatus.

Note that the focusing servo circuit 7, tracking servo circuit 8 and laser control circuit 9 need not be circuits incorporated in the controller 4 but can instead be components separate of the controller 4. Moreover, they need not be physical circuits but can instead be accomplished by software programs executed in the controller 4.

Here follows a description of the structure of an optical recording medium according to the present embodiment.

Figure 2:
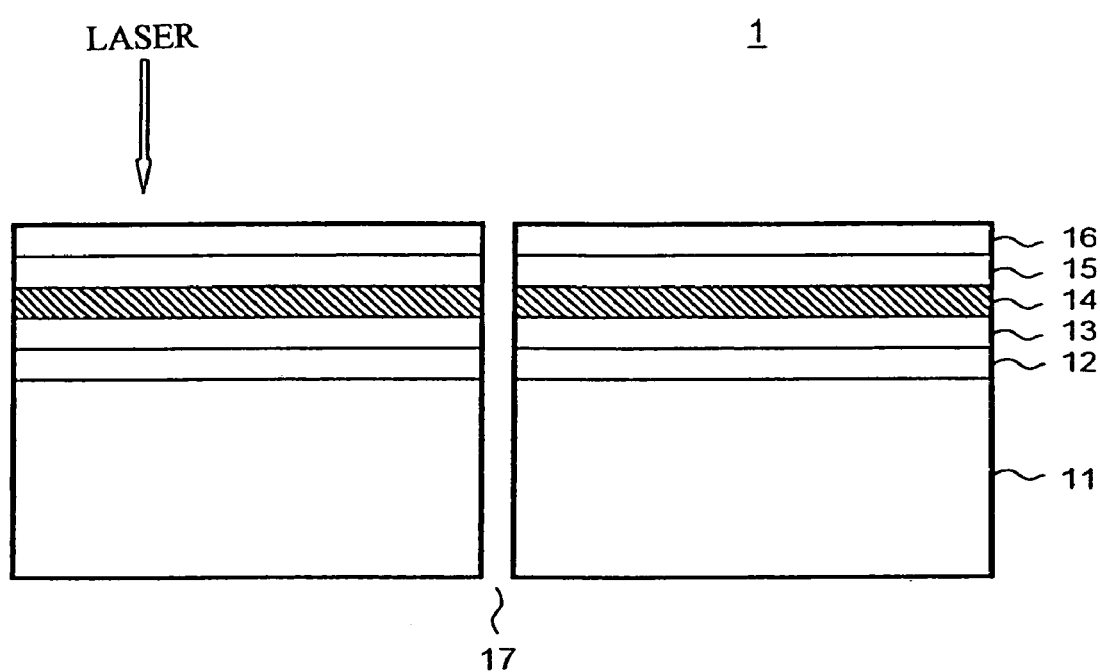
FIG. 2 is a schematic cross section illustrating the structure of an optical recording medium 1 according to a preferred embodiment of the present invention.

FIG. 2 is a schematic cross section illustrating the structure of an optical recording medium 1 according to the present embodiment.

As shown in FIG. 2, the optical recording medium 1 consists of a substrate 11 with a thickness of approximately 1.1 mm, a reflective layer 12 with a thickness of approximately 10–300 nm, a second dielectric layer 13 with a thickness of approximately 10–50 nm, a recording layer 14 with a thickness of approximately 5–30 nm, a first dielectric layer 15 with a thickness of approximately 3–30 nm, and a light transmission layer 16 with a thickness of approximately 50–150 µm. In addition, a hole 17 is provided in the center of the optical recording medium 1. When recording data onto an optical recording medium with such a structure, the working distance (the distance between the objective lens used to focus the laser beam, which is a part of the optical head 3, and the surface of the optical recording medium 1) is set extremely short (e.g., approximately 80–150 µm), and thus a beam spot diameter much smaller than that in the past is achieved. With an optical recording medium 1 having such a structure, it is possible to achieve a high data capacity and a high data transfer rate. In addition, the recording condition setting information described above is recorded on the optical recording medium 1. The recording condition setting information may be recorded as a wobble signal or pre-pits, or it may be recorded as data in the recording layer 14.

The recording layer 14 of the optical recording medium 1 is made up of a phase-change film that has a different reflectance in the crystalline phase than in the amorphous phase, and this property is utilized to record data. Specifically, the unrecorded regions of the recording layer 14 are crystalline so their reflectance may be 20%, for example. To record some sort of data in such unrecorded regions, certain portions of the recording layer 14 depending on the data to be recorded are heated to a temperature in excess of the melting point and then rapidly cooled to change them into the amorphous state. The reflectance of the amorphous portions may become 7%, for example, assuming the state in which the stipulated data is recorded. Moreover, to overwrite data once it is recorded, the portions of the recording layer 14 that are recorded with data to be overwritten are heated to either above the crystallization temperature or above the melting point depending on the data to be recorded, thus changing it into the crystalline or amorphous state.

In this case, taking $P_w$ to be the write power level of the laser beam shined in order to melt the recording layer 14, $P_b$ to be the base power of the laser beam shined when cooling the recording layer 14 and $P_e$ to be the erase power of the laser beam shined when crystallizing the recording layer 14, they have the following relationship:

$$P_w > P_e > P_b.$$

Accordingly, when recording data to the optical recording medium 1, the controller 4 controls the laser driving circuit 5 via the laser control circuit 9 so that the power of the laser beam assumes the values $P_w$, $P_e$ and $P_b$ based on the recording condition setting information read from the optical recording medium 1, and the laser driving circuit 5 controls the power of the laser driving signal based thereupon. For example, the laser beam power levels $P_w$, $P_e$ and $P_b$ may be set to 6.0 mW, 2.8 mW and 0.1 mW, respectively.

In the information recording method according to this preferred embodiment, the (1,7) RLL modulation scheme is adopted. However, the application of the information recording method according to the present invention is not limited to the case in which this modulation scheme is used, but rather it is naturally applicable to cases in which another modulation scheme is used. Note that in this Specification, the method of shining the laser beam in order to form a recording mark, namely the number of pulses in the laser beam, pulse width of each pulse, pulse interval, pulse power and other settings are collectively called the "pulse train pattern." Note that the pulse train pattern is also called the "recording strategy."

In addition, the recording condition setting information incorporated into the optical recording medium 1 contains content for determining which pulse train pattern should be used to record data, so the information recording apparatus shown in FIG. 1 performs the recording of data with the pulse train pattern to be described in detail below based on this determination.

Here, in the information recording method according to this preferred embodiment, the number of pulses in the laser beam shined during recording is set so that recording marks of lengths corresponding to even-number multiples of T (2T, 4T, 6T and 8T) are formed using a number of pulses equal to n (n is a multiple)/2, while recording marks of lengths corresponding to odd-number multiples of T (3T, 5T and 7T) are formed using a number of pulses equal to (n−1)/2.

In addition, in the information recording method according to this preferred embodiment, the pulse interval is set substantially constant in the formation of all recording marks wherein the number of pulses used is 2 or more (4T to 8T). Moreover, in the information recording method according to this preferred embodiment, the cooling interval is set substantially constant in the formation of all recording marks (2T to 8T). Furthermore, in the information recording method according to this preferred embodiment, among the recording marks wherein the number of pulses used is 2 or greater, the pulse width of the last pulse is set equal to each other for those recording marks of a length corresponding to even-number multiples of T (4T, 6T and 8T), and the pulse width of the last pulse is set equal to each other for those recording marks of a length corresponding to odd-number multiples of T (5T and 7T). Here follows a detailed description of the information recording method according to this preferred embodiment.

Figure 3:
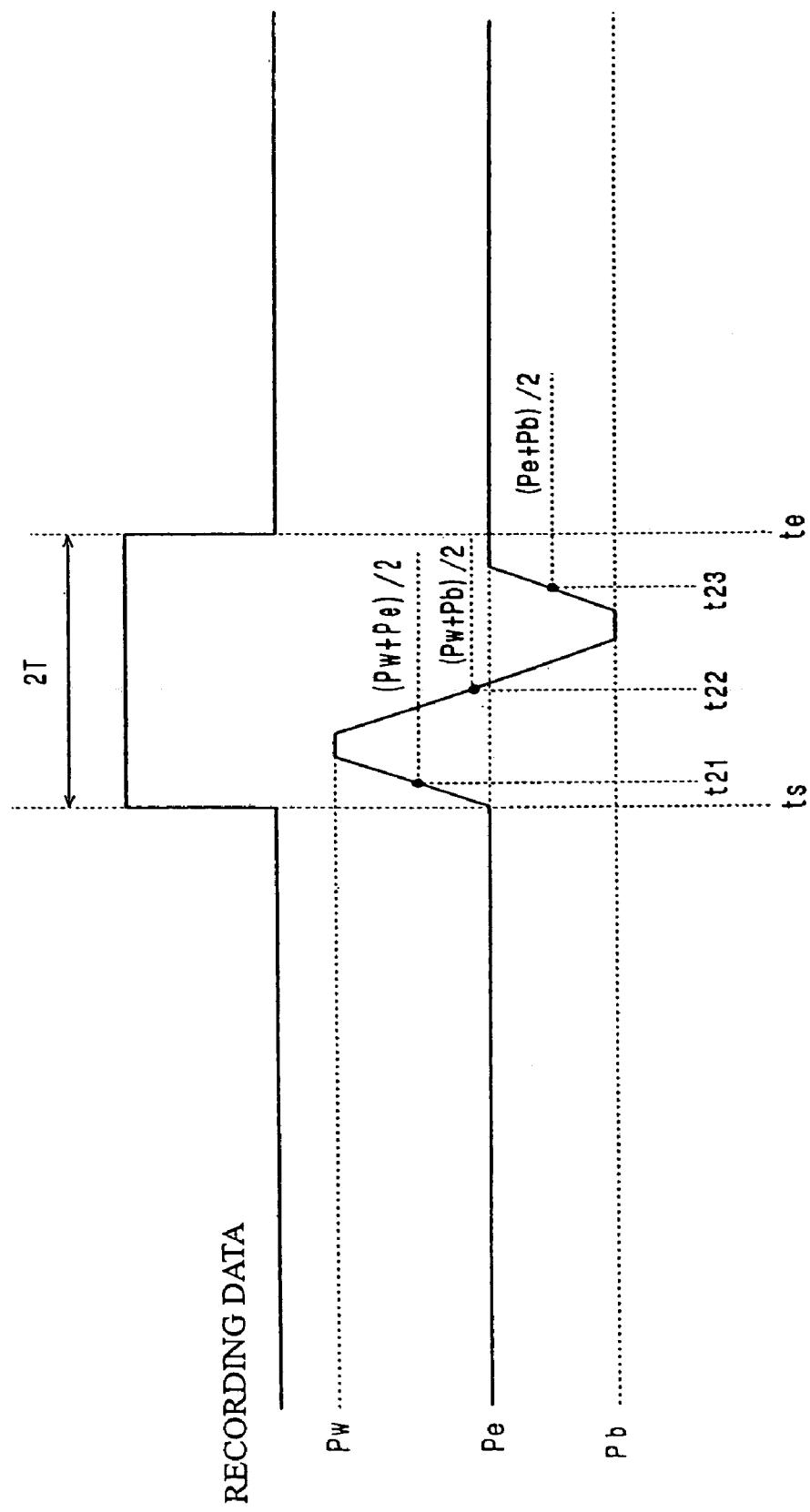
FIG. 3 is a drawing illustrating the pulse train pattern in the case of forming a recording mark of a length corresponding to 2T.

FIG. 3 is a drawing illustrating the pulse train pattern in the case of forming a recording mark of a length corresponding to 2T.

As shown in FIG. 3, when forming a recording mark of a length corresponding to 2T, n is an even number and the number given by n/2 is 1 so the number of pulses in the laser beam is set to 1. Here, the number of pulses in the laser beam is defined by the number of times the power of the laser beam shined during recording is raised to $P_w$. More specifically, taking the time $t_s$ to be the timing at which the laser beam is positioned at the starting point of the recording mark and the time $t_e$ to be the timing at which the laser beam is positioned at the ending point of the recording mark, during the period from the time $t_s$ to the time $t_e$, the laser beam power is first set to $P_w$ and then set to the power $P_b$. Here, the laser beam power before the time $t_s$ is set to $P_e$ and the power of the laser beam begins to rise at the time $t_s$. In addition, the laser beam power at the time $t_e$ is set to $P_e$ or $P_b$.

Here, when the interval from time $t_{21}$ to time $t_{22}$ shown on FIG. 3 is defined to be $T_{top(2T)}$ and the interval from time $t_{22}$ to time t23 is defined to be $T_{cl(2T)}$, $T_{top(2T)}$ is set to ~0.6T and $T_{cl(2T)}$ is set to ~0.7T. As shown in FIG. 3, the time $t_{21}$ is the timing at which the laser beam power exceeds $(P_w+P_e)/2$, the time $t_{22}$ is the timing at which the laser beam power drops below $(P_w+P_b)/2$, and the time $t_{23}$ is the timing at which the laser beam power exceeds $(P_e+P_b)/2$.

During the interval $T_{top(2T)}$, the recording layer 14 of the optical recording medium 1 receives a large amount of energy and its temperature exceeds the melting point, and during the interval $T_{cl(2T)}$, the recording layer 14 of the optical recording medium 1 is rapidly cooled. Thereby, a recording mark of a length corresponding to 2T is formed in the recording layer 14 of the optical recording medium 1.

Figure 4:
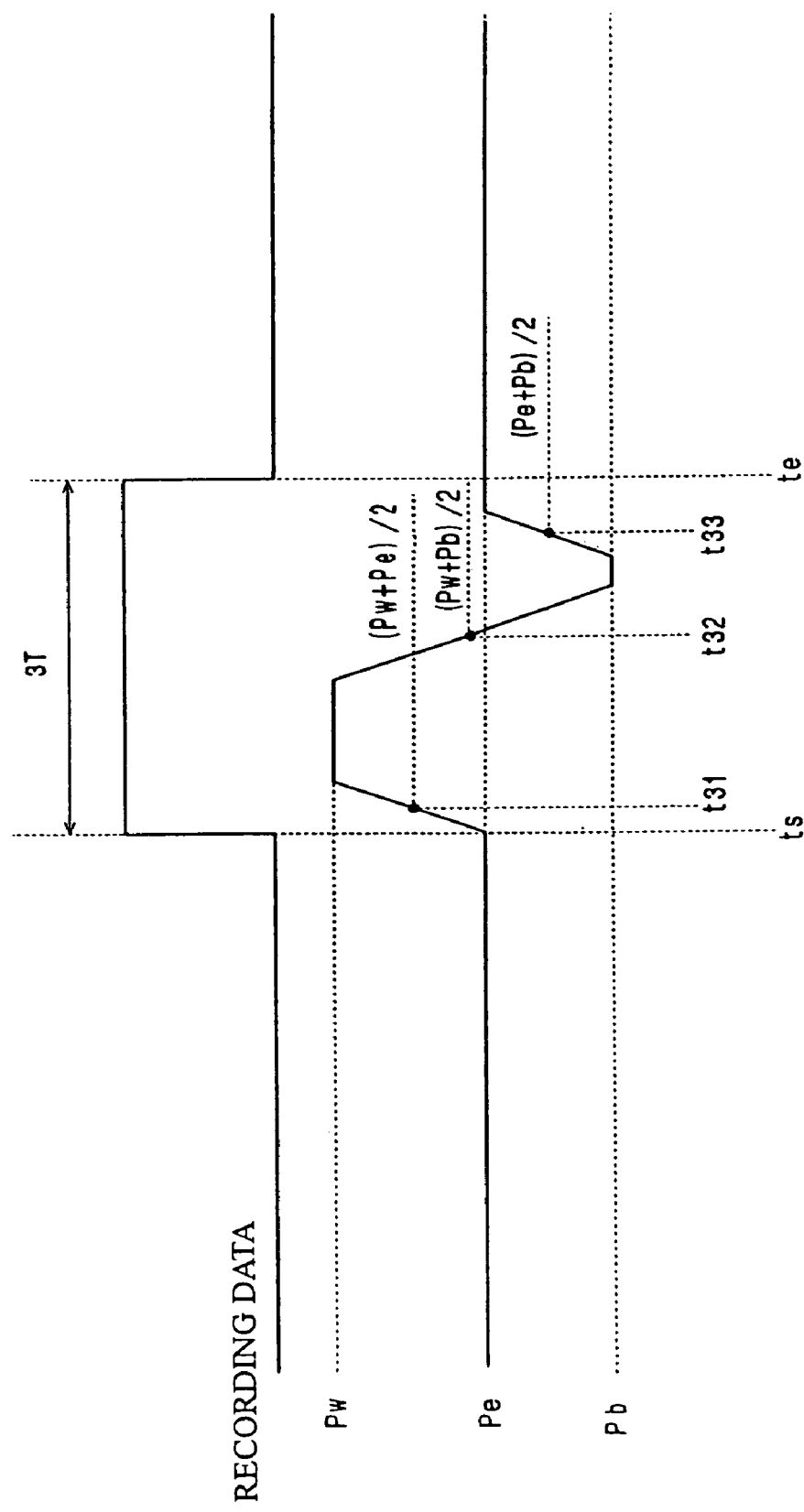
FIG. 4 is a drawing illustrating the pulse train pattern in the case of forming a recording mark of a length corresponding to 3T.

FIG. 4 is a drawing illustrating the pulse train pattern in the case of forming a recording mark of a length corresponding to 3T.

As shown in FIG. 4, when forming a recording mark of a length corresponding to 3T, n is an odd number and the number given by (n−1)/2 is 1 so the number of pulses in the laser beam is set to 1. More specifically, during the period from the time $t_s$ to the time $t_e$, the laser beam power is first set to $P_w$ and then set to the power $P_b$. Here, the laser beam power before the time $t_s$ is set to $P_e$ and the power of the laser beam begins to rise at the time $t_s$. In addition, the laser beam power at the time $t_e$ is set to $P_e$ or $P_b$.

Here, when the interval from time $t_{31}$ to time $t_{32}$ shown on FIG. 4 is defined to be $T_{top(3T)}$ and the interval from time $t_{32}$ to time $t_{33}$ is defined to be $T_{cl(3T)}$, $T_{top(3T)}$ is set to ~1.3T and $T_{cl(3T)}$ is set to ~0.7T. As shown in FIG. 4, the time $t_{31}$ is the timing at which the laser beam power exceeds $(P_w+P_e)/2$, the time $t_{32}$ is the timing at which the laser beam power drops below $(P_w+P_b)/2$, and the time $t_{33}$ is the timing at which the laser beam power exceeds $(P_e+P_b)/2$.

In this manner, in the formation of a recording mark of a length corresponding to 3T, the number of pulses in the laser beam is set to 1 and also the cooling interval $T_{cl(3T)}$ is set to the same length as the cooling interval $T_{cl(2T)}$ above.

During the interval $T_{top(3T)}$, the recording layer 14 of the optical recording medium 1 receives a large amount of energy and its temperature exceeds the melting point, and during the interval $T_{cl(3T)}$, the recording layer 14 of the optical recording medium 1 is rapidly cooled. Thereby, a recording mark of a length corresponding to 3T is formed in the recording layer 14 of the optical recording medium 1. In this manner, in the formation of a recording mark of a length corresponding to 3T, the same number of pulses as when to forming a recording mark of a length corresponding to 2T is used, but the pulse width $T_{top}$ is set longer than when forming a recording mark of a length corresponding to 2T, so the position of the trailing edge of the recording mark is shifted backward, so it is possible to form a recording mark of a length corresponding to 3T.

Figure 5:
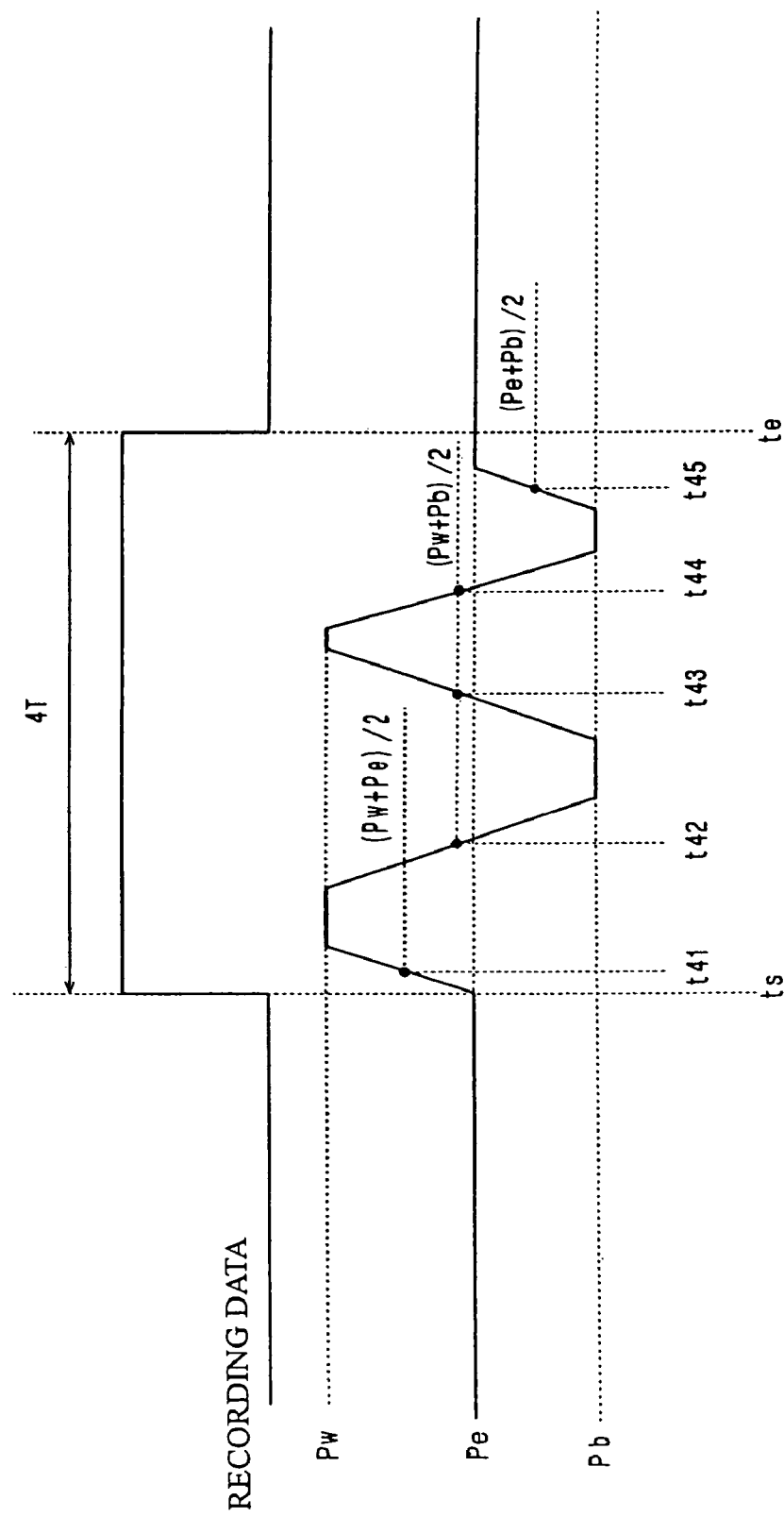
FIG. 5 is a drawing illustrating the pulse train pattern in the case of forming a recording mark of a length corresponding to 4T.

FIG. 5 is a drawing illustrating the pulse train pattern in the case of forming a recording mark of a length corresponding to 4T.

As shown in FIG. 5, when forming a recording mark of a length corresponding to 4T, n is an even number and the number given by n/2 is 2 so the number of pulses in the laser beam is set to 2. More specifically, during the period from the time $t_s$ to the time $t_e$, the set consisting of the combination of the laser beam power being first set to $P_w$ and then being set to the power $P_b$ is repeated twice. Here, the laser beam power before the time $t_s$ is set to $P_e$ and the power of the laser beam begins to rise at the time $t_s$. In addition, the laser beam power at the time $t_e$ is set to $P_e$ or $P_b$.

Here, when the interval from time $t_{41}$ to time $t_{42}$ shown on FIG. 5 is defined to be $T_{top(4T)}$, the interval from time $t_{42}$ to time $t_{43}$ is defined to be $T_{off(4T)}$, the interval from time $t_{43}$ to time $t_{44}$ is defined to be $T_{last(4T)}$, and the interval from time $t_{44}$ to time $t_{45}$ is defined to be $T_{cl(4T)}$, $T_{top(4T)}$ is set to ~1.0T, $T_{off(4T)}$ is set to ~1.0T, $T_{last(4T)}$ is set to ~0.7T, and $T_{cl(4T)}$ is set to 0.7T. As shown in FIG. 5, the time $t_{41}$ is the timing at which the laser beam power exceeds $(P_w+P_e)/2$, the times $t_{42}$ and $t_{44}$ are the timing at which the laser beam power drops below $(P_w+P_b)/2$, the time $t_{43}$ is the timing at which the laser beam power exceeds $(P_w+P_b)/2$, and the time $t_{45}$ is the timing at which the laser beam power exceeds $(P_e+P_b)/2$.

In this manner, in the formation of a recording mark of a length corresponding to 4T, the number of pulses in the laser beam is set to 2 and also the cooling interval $T_{cl(4T)}$ is set to the same length as the cooling intervals $T_{cl(2T)}$ and $T_{cl(3T)}$ above.

During the intervals $T_{top(4T)}$, $T_{off(4T)}$, and $T_{last(4T)}$, the recording layer 14 of the optical recording medium 1 receives a large amount of energy and its temperature exceeds the melting point, and during the interval $T_{cl(4T)}$ the recording layer 14 of the optical recording medium 1 is rapidly cooled. Thereby, a recording mark of a length corresponding to 4T is formed in the recording layer 14 of the optical recording medium 1. In this manner, in the formation of a recording mark of a length corresponding to 4T, the pulse width of the top pulse $T_{top}$ is set shorter than when forming a recording mark of a length corresponding to 3T, so the thermal effects of the subsequent last pulse are suppressed, so it is possible to form a recording mark of a length corresponding to 4T.

Figure 6:
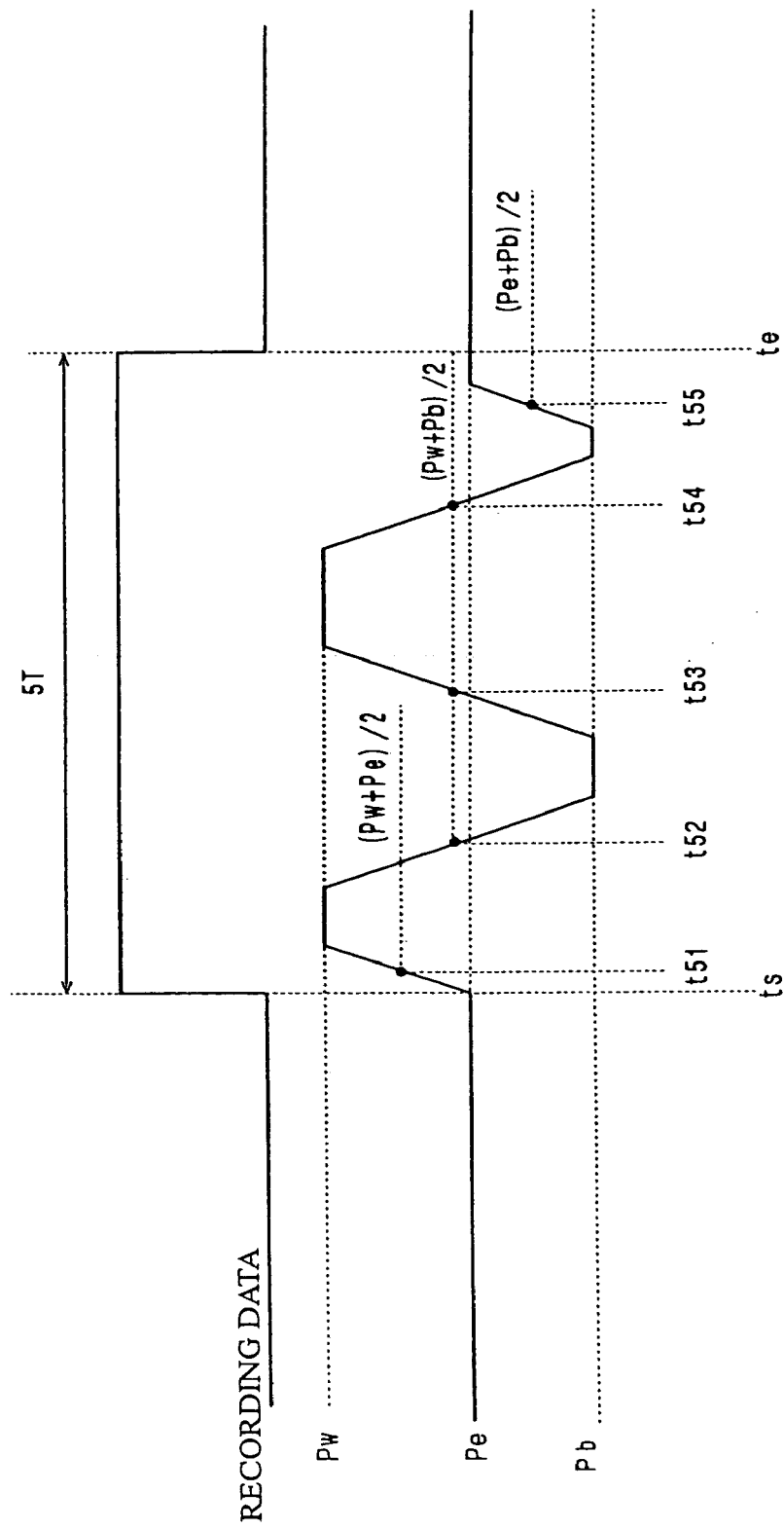
FIG. 6 is a drawing illustrating the pulse train pattern in the case of forming a recording mark of a length corresponding to 5T.

FIG. 6 is a drawing illustrating the pulse train pattern in the case of forming a recording mark of a length corresponding to 5T.

As shown in FIG. 6, when forming a recording mark of a length corresponding to 5T, n is an odd number and the number given by (n−1)/2 is 2 so the number of pulses in the laser beam is set to 2. More specifically, during the period from the time $t_s$ to the time $t_e$, the set consisting of the combination of the laser beam power being first set to $P_w$ and then being set to the power $P_b$ is repeated twice. Here, the laser beam power before the time $t_s$ is set to $P_e$ and the power of the laser beam begins to rise at the time $t_s$. In addition, the laser beam power at the time $t_e$ is set to $P_e$ or $P_b$.

Here, when the interval from time $t_{51}$ to time $t_{52}$ shown on FIG. 6 is defined to be $T_{top(5T)}$, the interval from time $t_{52}$ to time $t_{53}$ is defined to be $T_{off(5T)}$, the interval from time $t_{53}$ to time $t_{54}$ is defined to be $T_{last(5T)}$, and the interval from time $t_{54}$ to time $t_{55}$ is defined to be $T_{cl(5T)}$, $T_{top(5t)}$ is set to ~1.0T, $T_{off(5T)}$ is set to ~1.0T, $T_{last(5T)}$ is set to ~1.3T, and $T_{cl(5T)}$ is set to ~0.7T. As shown in FIG. 6, the time $t_{51}$ is the timing at which the laser beam power exceeds $(P_w+P_e)/2$, the times $t_{52}$ and $t_{54}$ are the timing at which the laser beam power drops below $(P_w+P_b)/2$, the time $t_{53}$ is the timing at which the laser beam power exceeds $(P_w+P_b)/2$, and the time $t_{55}$ is the timing at which the laser beam power exceeds $(P_e+P_b)/2$.

In this manner, in the formation of a recording mark of a length corresponding to 5T, the number of pulses in the laser beam is set to 2 and also the cooling interval $T_{cl(5T)}$ is set to the same length as the cooling intervals $T_{cl(2T)}$ through $T_{cl(4T)}$ above. Moreover, the pulse interval $T_{off(5T)}$ is set to the same length as the pulse interval $T_{off(4T)}$ above.

During the intervals $T_{top(5T)}$, $T_{off(5T)}$, and $T_{last(5T)}$ the recording layer 14 of the optical recording medium 1 receives a large amount of energy and its temperature exceeds the melting point, and during the interval $T_{cl(5T)}$, the recording layer 14 of the optical recording medium 1 is rapidly cooled. Thereby, a recording mark of a length corresponding to 5T is formed in the recording layer 14 of the optical recording medium 1. In this manner, in the formation of a recording mark of a length corresponding to 5T, the same number of pulses as when forming a recording mark of a length corresponding to 4T is used, but the pulse width of the last pulse $T_{last}$ is set longer than when forming a recording mark of a length corresponding to 4T, so the position of the trailing edge of the recording mark is shifted backward, and thus it is possible to form a recording mark of a length corresponding to 5T.

Figure 7:
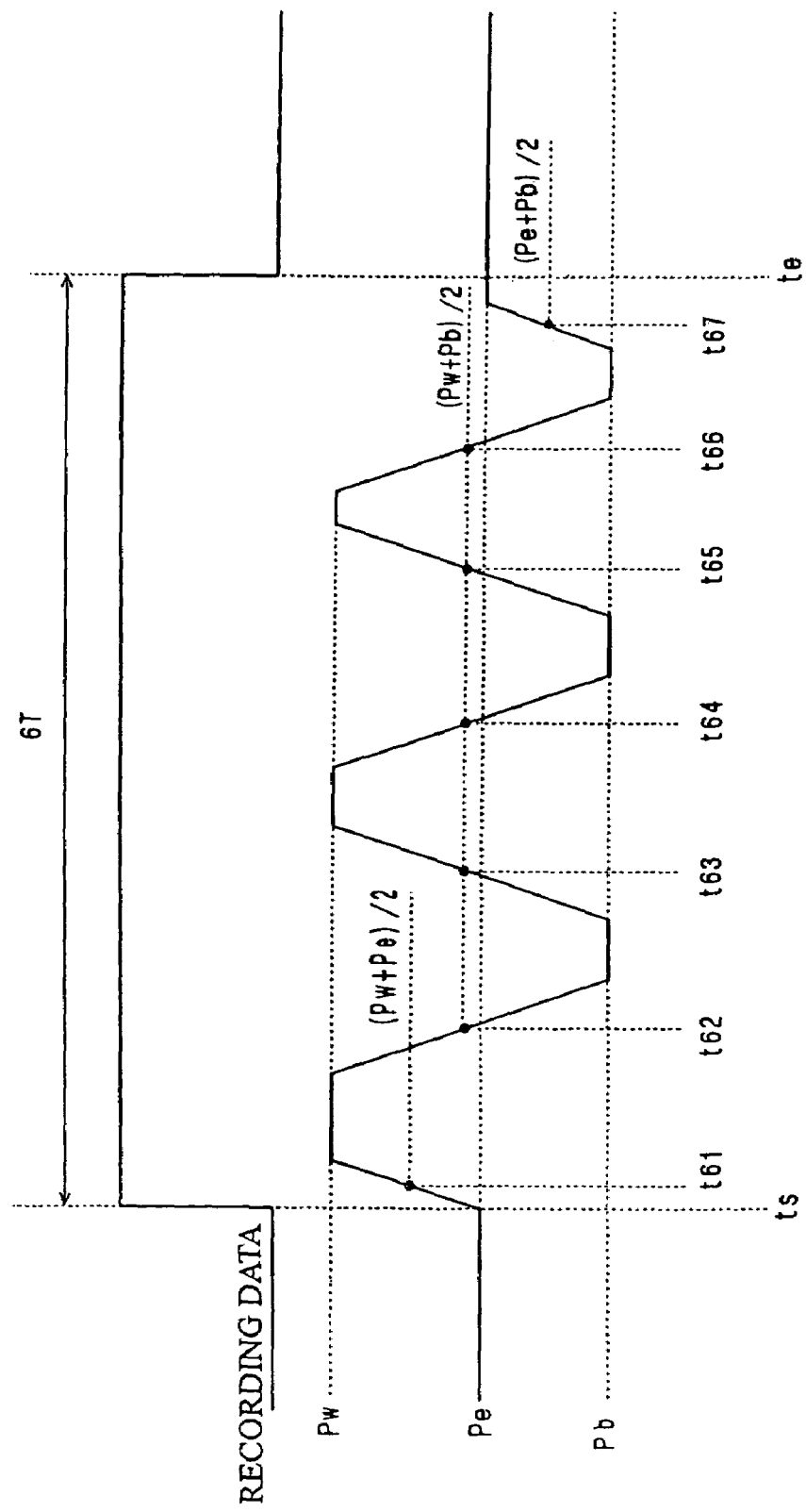
FIG. 7 is a drawing illustrating the pulse train pattern in the case of forming a recording mark of a length corresponding to 6T.

FIG. 7 is a drawing illustrating the pulse train pattern in the case of forming a recording mark of a length corresponding to 6T.

As shown in FIG. 7, when forming a recording mark of a length corresponding to 6T, n is an even number and the number given by n/2 is 3 so the number of pulses in the laser beam is set to 3. More specifically, during the period from the time $t_s$ to the time $t_e$, the set consisting of the combination of the laser beam power being first set to $P_w$ and then being set to the power $P_b$ is repeated three times. Here, the laser beam power before the time $t_s$ is set to $P_e$ and the power of the laser beam begins to rise at the time $t_s$. In addition, the laser beam power at the time $t_e$ is set to $P_e$ or $P_b$.

Here, when the interval from time $t_{61}$ to time $t_{62}$ shown on FIG. 7 is defined to be $T_{top(6T)}$, the interval from time $t_{62}$ to time $t_{63}$ is defined to be $T_{off(6T-1)}$, the interval from time $t_{63}$ to time $t_{64}$ is defined to be $T_{mp(6T)}$, the interval from time $t_{64}$ to time $t_{65}$ is defined to be $T_{off(6T-2)}$, the interval from time $t_{65}$ to time $t_{66}$ is defined to be $T_{last(6T)}$, and the interval from time $t_{66}$ to time $t_{67}$ is defined to be $T_{cl(6T)}$, $T_{top(6T)}$ is set to ~1.0T, $T_{off(6T-1)}$ is set to ~1.0T, $T_{mp(6T)}$ is set to ~1.0T, $T_{off(6T-2)}$ is set to ~1.0T, $T_{last(6T)}$ is set to ~0.7T, and $T_{cl(6T)}$ is set to ~0.7T. As shown in FIG. 7, the time $t_{61}$ is the timing at which the laser beam power exceeds $(P_w+P_e)/2$, the times $t_{62}$, $t_{64}$ and $t_{66}$ are the timing at which the laser beam power drops below $(P_w+P_b)/2$, the times $t_{63}$ and $t_{65}$ are the timing at which the laser beam power exceeds $(P_w+P_b)/2$, and the time $t_{67}$ is the timing at which the laser beam power exceeds $(P_e+P_b)/2$.

In this manner, in the formation of a recording mark of a length corresponding to 6T, the number of pulses in the laser beam is set to 3 and also the cooling interval $T_{cl(6T)}$ is set to the same length as the cooling intervals $T_{cl(2T)}$ through $T_{cl(5T)}$ above. Moreover, the pulse intervals $T_{off(6T-1)}$ and $T_{off(6T-2)}$ are each set to the same length as the pulse intervals $T_{off(4T)}$ and $T_{off(5T)}$ above.

During the intervals $T_{top(6T)}$, $T_{off(6T-1)}$, $T_{mp(6T)}$, $T_{off(6T-2)}$, and $T_{last(6T)}$, the recording layer 14 of the optical recording medium 1 receives a large amount of energy and its temperature exceeds the melting point, and during the interval $T_{cl(6T)}$, the recording layer 14 of the optical recording medium 1 is rapidly cooled. Thereby, a recording mark of a length corresponding to 6T is formed in the recording layer 14 of the optical recording medium 1. In this manner, in the formation of a recording mark of a length corresponding to 6T, the number of pulses is increased in comparison to when forming a recording mark of a length corresponding to 5T, and the pulse width of the last pulse $T_{last}$ is set shorter than when forming a recording mark of a length corresponding to 5T so it is possible to form a recording mark of a length corresponding to 6T.

Figure 8:
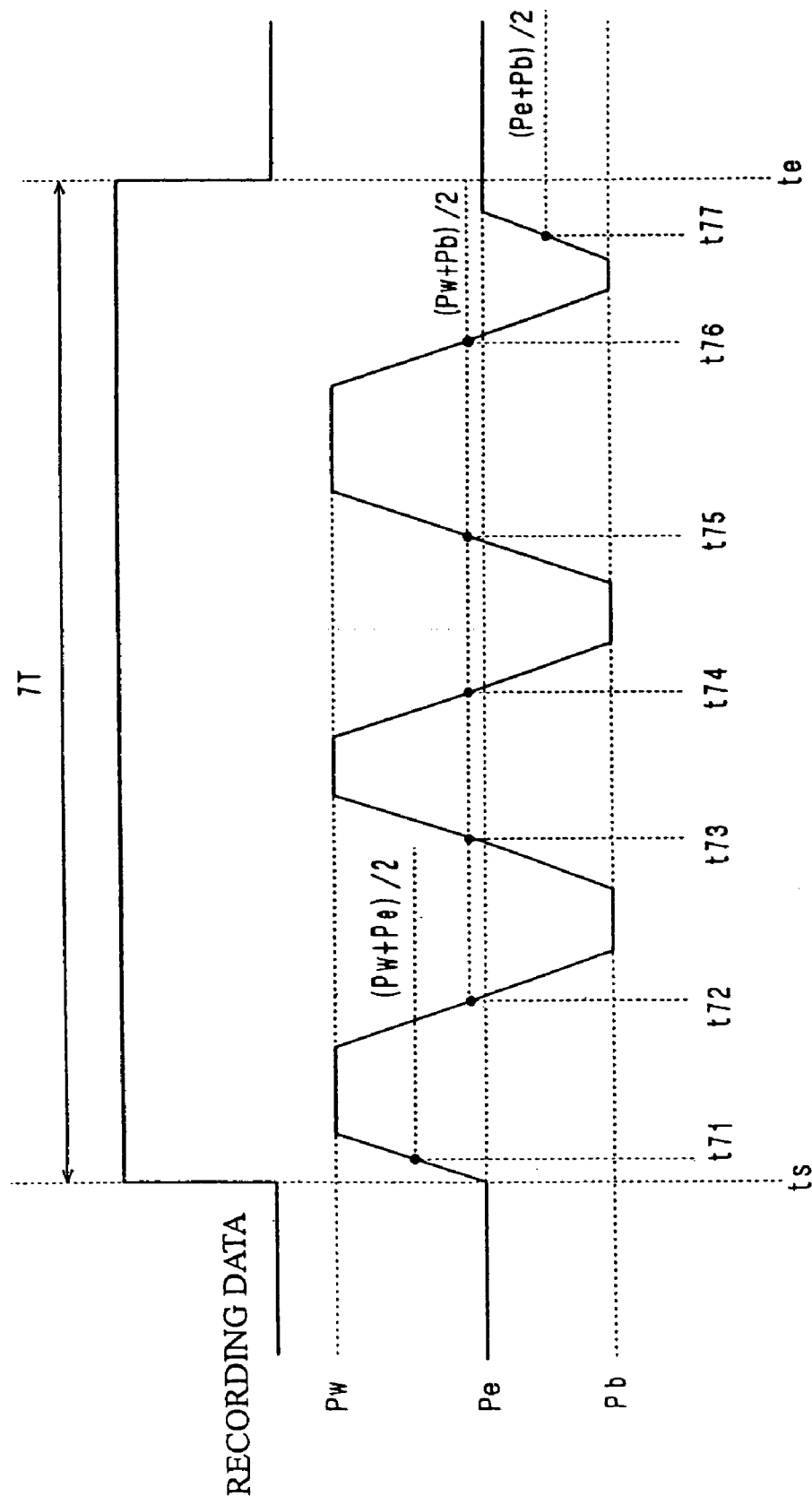
FIG. 8 is a drawing illustrating the pulse train pattern in the case of forming a recording mark of a length corresponding to 7T.

FIG. 8 is a drawing illustrating the pulse train pattern in the case of forming a recording mark of a length corresponding to 7T.

As shown in FIG. 8, when forming a recording mark of a length corresponding to 7T, n is an odd number and the number given by (n−1)/2 is 3 so the number of pulses in the laser beam is set to 3. More specifically, during the period from the time $t_s$ to the time $t_e$, the set consisting of the combination of the laser beam power being first set to $P_w$ and then being set to the power $P_b$ is repeated three times. Here, the laser beam power before the time $t_s$ is set to $P_e$ and the power of the laser beam begins to rise at the time $t_s$. In addition, the laser beam power at the time $t_e$ is set to $P_e$ or $P_b$.

Here, when the interval from time $t_{71}$ to time $t_{72}$ shown on FIG. 8 is defined to be $T_{top(7T)}$, the interval from time $t_{72}$ to time $t_{73}$ is defined to be $T_{off(7T-1)}$, the interval from time $t_{73}$ to time $t_{74}$ is defined to be $T_{mp(7T)}$, the interval from time $t_{74}$ to time $t_{75}$ is defined to be $T_{off(7T-2)}$, the interval from time $t_{75}$ to time $t_{76}$ is defined to be $T_{last(7T)}$, and the interval from time $t_{76}$ to time $t_{77}$ is defined to be $T_{cl(7T)}$, $T_{top(7T)}$ is set to ~1.0T, $T_{off(7T-1)}$ is set to ~1.0T, $T_{mp(7T)}$ is set to ~1.0T, $T_{top(7T-2)}$ is set to ~1.0T, $T_{last(7T)}$ is set to ~1.3T, and $T_{cl(7T)}$ is set to ~0,7T. As shown in FIG. 8, the time $t_{71}$, is the timing at which the laser beam power exceeds $(P_w+P_e)/2$, the times $t_{72}$, $t_{74}$ and $t_{76}$ are the timing at which the laser beam power drops below $(P_w+P_b)/2$, the times $t_{73}$ and $t_{75}$ are the timing at which the laser beam power exceeds $(P_w+P_b)/2$, and the time $t_{77}$ is the timing at which the laser beam power exceeds $(P_e+P_b)/2$.

In this manner, in the formation of a recording mark of a length corresponding to 7T, the number of pulses in the laser beam is set to 3 and also the cooling interval $T_{cl(7T)}$ is set to the same length as the cooling intervals $T_{cl(2T)}$ through $T_{cl(6T)}$ above Moreover, the pulse intervals $T_{off(7T-1)}$ and $T_{off(7T-2)}$ are each set to the same length as the pulse intervals $T_{off(4T)}$, $T_{off(5T)}$ $T_{off(6T-1)}$ and $T_{off(7T-2)}$ above.

During the intervals $T_{top(7T)}$, $T_{off(7T-1)}$, $T_{mp(7T)}$, $T_{off(7T-2)}$, and $T_{last(7T)}$, the recording layer 14 of the optical recording medium 1 receives a large amount of energy and its temperature exceeds the melting point, and during the interval $T_{cl(7T)}$, the recording layer 14 of the optical recording medium 1 is rapidly cooled. Thereby, a recording mark of a length corresponding to 7T is formed in the recording layer 14 of the optical recording medium 1. In this manner, in the formation of a recording mark of a length corresponding to 7T, the same number of pulses as when forming a recording mark of a length corresponding to 6T is used, but the pulse width of the last pulse $T_{last}$ is set longer than when forming a recording mark of a length corresponding to 6T, so the position of the trailing edge of the recording mark is shifted backward, and thus it is possible to form a recording mark of a length corresponding to 7T.

Figure 9:
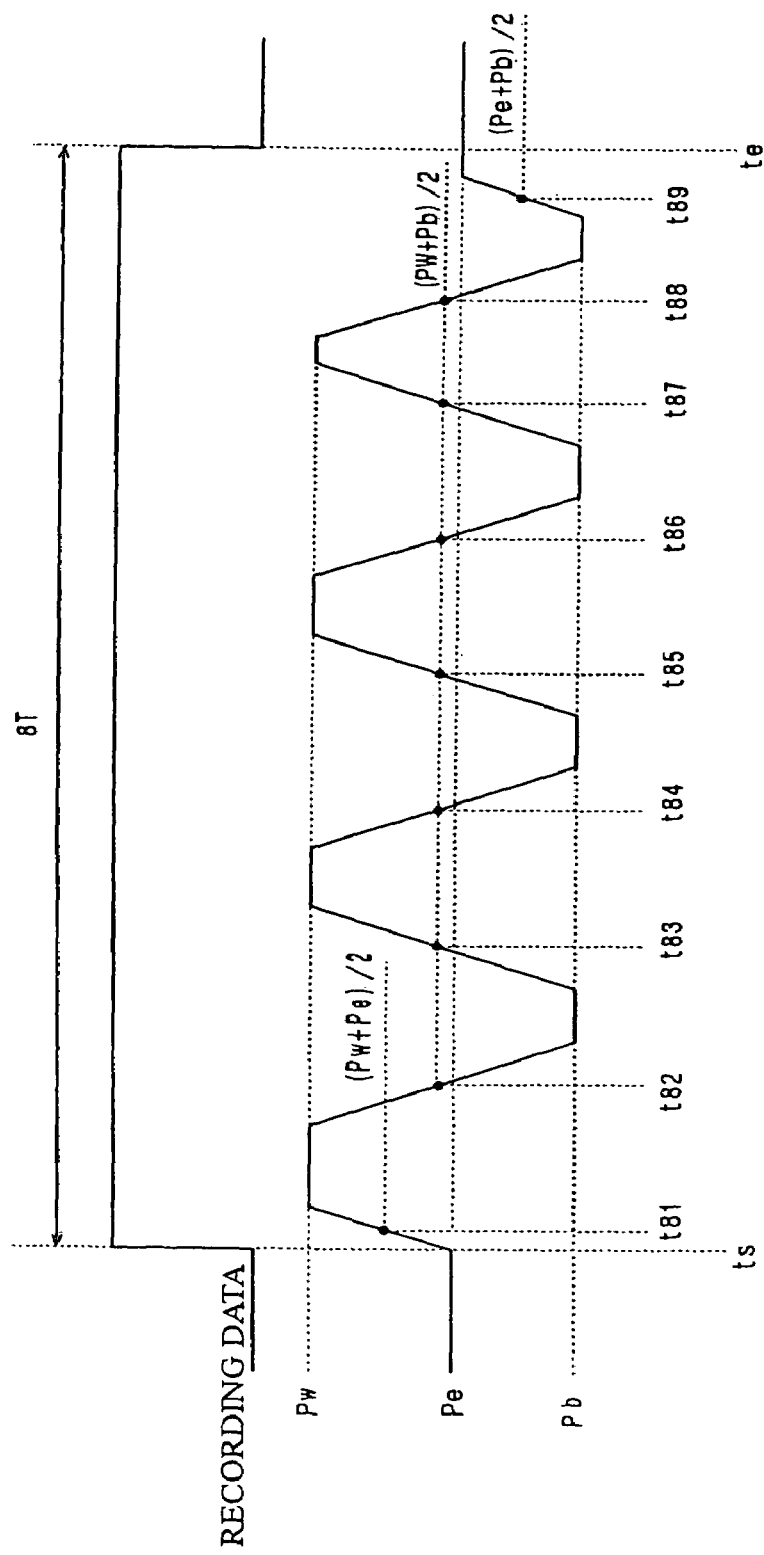
FIG. 9 is a drawing illustrating the pulse train pattern in the case of forming a recording mark of a length corresponding to 8T.

FIG. 9 is a drawing illustrating the pulse train pattern in the case of forming a recording mark of a length corresponding to 8T.

As shown in FIG. 9, when forming a recording mark of a length corresponding to 8T, n is an even number and the number given by n/2 is 4 so the number of pulses in the laser beam is set to 4. More specifically, during the period from the time $t_s$ to the time $t_e$, the set consisting of the combination of the laser beam power being first set to $P_w$ and then being set to the power $P_b$ is repeated four times. Here, the laser beam power before the time $t_s$ is set to $P_e$ and the power of the laser beam begins to rise at the time $t_s$. In addition, the laser beam power at the time $t_e$ is set to $P_e$ or $P_b$.

Here, when the interval from time $t_{81}$ to time $t_{82}$ shown on FIG. 9 is defined to be $T_{top(8T)}$, the interval from time $t_{82}$ to time $t_{83}$ is defined to be $T_{off(8T-1)}$, the interval from time $t_{83}$ to time $t_{84}$ is defined to be $T_{mp(8T-1)}$, the interval from time $t_{84}$ to time $t_{85}$ is defined to be $T_{off(8T-2)}$, the interval from time $t_{85}$ to time t86 is defined to be $T_{mp(8T-2)}$ the interval from time $t_{86}$ to time $t_{87}$ is defined to be $T_{off(8T-3)}$, the interval from time $t_{87}$ to time $t_{88}$ is defined to be $T_{last(8T)}$, and the interval from time $t_{88}$ to time $t_{89}$ is defined to be $T_{cl(8T)}$, $T_{top(8T)}$ is set to ~1.0T, $T_{off(8T-1)}$ is set to ~1.0T, $T_{mp(8T-1)}$ is set to ~1.0T, $T_{off(8T-2)}$ is set to ~1.0T, $T_{mp(8T-2)}$ is set to ~1.0T, $T_{off(8T-3)}$ is set to ~1.0T, $T_{last(8T)}$ is set to ~0.7T, and $T_{cl(8T)}$ is set to ~0.7T. As shown in FIG. 9, the time $t_{81}$ is the timing at which the laser beam power exceeds $(P_w+P_e)/2$, the times $t_{82}$, $t_{84}$, $t_{86}$ and $t_{88}$ are the timing at which the laser beam power drops below $(P_w+P_b)/2$, the times $t_{83}$, $t_{85}$ and $t_{87}$ are the timing at which the laser beam power exceeds $(P_w+P_b)/2$, and the time $t_{89}$ is the timing at which the laser beam power exceeds $(P_e+P_b)/2$.

In this manner, in the formation of a recording mark of a length corresponding to 8T, the number of pulses in the laser beam is set to 4 and also the cooling interval $T_{cl(8T)}$ is set to the same length as the cooling intervals $T_{cl(2T)}$ through $T_{cl(7T)}$ above. Moreover, the pulse intervals $T_{off(8T-1)}$ through $T_{off(8T-3)}$ are each set to the same length as the pulse intervals $T_{off(4T)}$, $T_{off(5T)}$, $T_{off(6T-1)}$, $T_{off(6T-2)}$, $T_{off(7T-1)}$ and $T_{off(7T-2)}$ above.

During the intervals $T_{top(8T)}$, $T_{off(8T-1)}$, $T_{mp(8T-1)}$, $T_{off(8T-2)}$, $T_{mp(8T-2)}$, $T_{off(8T-3)}$, and $T_{last(8T)}$, the recording layer 14 of the optical recording medium 1 receives a large amount of energy and its temperature exceeds the melting point, and during the interval $T_{cl(8T)}$, the recording layer 14 of the optical recording medium 1 is rapidly cooled. Thereby, a recording mark of a length corresponding to 8T is formed in the recording layer 14 of the optical recording medium 1. In this manner, in the formation of a recording mark of a length corresponding to 8T, the number of pulses is increased in comparison to when forming a recording mark of a length corresponding to 7T, and the pulse width of the last pulse $T_{last}$ is set shorter than when forming a recording mark of a length corresponding to 7T, SO it is possible to form a recording mark of a length corresponding to 8T.

In this manner, in this preferred embodiment, the same number of pulses (1) is used to form recording marks of a length corresponding to 2T and 3T, but the pulse width $T_{top(3T)}$ is set longer than the pulse width $T_{top(2T)}$ and the cooling intervals $T_{cl(2T)}$, and $T_{cl(3T)}$ are set equally, so recording marks of different lengths are formed. In addition, in this preferred embodiment, the same number of pulses (2) is used to form recording marks of a length corresponding to 4T and 5T, but the interval $T_{last(5T)}$ is set longer than the interval $T_{last(4T)}$ and the pulse width $T_{off(4T)}$ and pulse width $T_{off(5T)}$ are set equally, so recording marks of different lengths are formed. Moreover, in this preferred embodiment, the same number of pulses (3) is used to form recording marks of a length corresponding to 6T and 7T, but the interval $T_{last(7T)}$ is set longer than the interval $T_{last(6T)}$ and the pulse widths $T_{off(6T-1)}$, $T_{off(6T-2)}$, $T_{off(7T-1)}$ and $T_{off(7T-2)}$ are set equally, so recording marks of different lengths are formed.

As described above, in this preferred embodiment, recording marks of lengths corresponding to even-number multiples of T (2T, 4T, 6T and 8T) are formed using a number of pulses equal to n (n is a multiple)/2, while recording marks of lengths corresponding to odd-number multiples of T (3T, 5T and 7T) are formed using a number of pulses equal to (n-1)/2, so even if the clock frequency is high and the clock period (T) is short, it is possible to reduce the number of pulses used to form one recording mark. For this reason, even if the recording linear velocity of the laser beam is set to approximately 16.3–32.6 m/s and the clock frequency is set to approximately 188–375MHz (T=~5.3–2.6 ns) so that the data transfer rate becomes 100–200 Mbps taking the format efficiency to be approximately 80%, it is possible to form recording marks with a good shape. In particular, if the recording linear velocity of the laser beam is set to approximately 22.8 m/s and the clock frequency is set to approximately 263 MHz (T=~3.8 ns) so that the data transfer rate becomes 140 Mbps taking the format efficiency to be approximately 80%, it is possible to form recording marks with the best shape.

In addition, in this preferred embodiment, as described above, in the formation of all recording marks in which a number of pulses equal to 2 or more is used (4T–8T), the pulse interval ($T_{off}$) is set to be constant (~1.0T) in all of them. In addition, in the formation of all recording marks (2T–8T), the cooling interval ($T_{cl}$) is set to be constant (~0.7T) in all of them. Furthermore, among the recording marks wherein the number of pulses used is 2 or greater, the pulse width of the last pulse ($T_{last}$) is set equal to each other (~0.7T) for those recording marks of a length corresponding to even-number multiples of T (4T, 6T and 8T), and the pulse width of the last pulse ($T_{last}$) is set equal to each other (~1.3T) for those recording marks of a length corresponding to odd-number multiples of T (5T and 7T). Thus, control of the drive is simplified, not only reducing the cost of a drive to which the information recording method according to this preferred embodiment is applied but also, even if the power of the laser beam shined during recording fluctuates for some reason, the effects of this fluctuation will become roughly uniform with respect to all recording marks, so it is possible to form recording marks with good shapes and it is also possible to suppress jitter. In other words, it is possible to maintain a wider power margin for the laser beam shined during recording.

The present invention is in no way limited to the aforementioned embodiment, but rather various modifications are possible within the scope of the invention as recited in the claims, and these are naturally included within the scope of the invention.

For example, in the preferred embodiment above, the number of pulses of the laser beam was set to 1, 1, 2, 2, 3, 3 and 4 when forming recording marks with lengths corresponding to 2T, 3T, 4T, 5T, 6T, 7T and 8T, respectively, but the pulse train pattern according to the present invention is not limited thereto, but rather a different pulse train pattern may be adopted as long as at least two types of recording marks are formed using a laser beam consisting of the same number of pulses. Accordingly, while in the above preferred embodiment, recording marks of lengths corresponding to odd-number multiples of T (3T, 5T and 7T) are formed using a number of pulses equal to (n-1)/2, they may also be formed using a number of pulses equal to (n+1)/2. In this case, the number of pulses of the laser beam would be set to 1, 2, 2, 3, 3, 4 and 4 when forming recording marks with lengths corresponding to 2T, 3T, 4T, 5T, 6T, 7T and 8T, respectively. In addition, accordingly, three or more types of recording marks (e.g., 2T, 3T and 4T) may be formed using a laser beam consisting of the same number of pulses (e.g., 1 pulse).

In addition, while the optical recording medium 1 shown in FIG. 2 is given as an example of a suitable optical recording medium for the application of the method of recording information to an optical recording medium according to the present embodiment, the information recording method according to the present invention is not limited in being applicable only to this optical recording medium, but rather it is applicable to any kind of optical recording medium as long as it is a recordable optical recording medium.

Moreover, in the aforementioned preferred embodiment, the power of the laser beam shined during recording is set to the three levels of $P_w$, $P_e$ and $P_b$, but it may also be set to two levels. For example, in the aforementioned preferred embodiment, the laser beam power $P_e$ is set higher than the laser beam power $P_b$ but they may also be set to the same power level. In addition, the power of the laser beam shined during recording may also be set to four or more levels.

In addition, while there is no particular limitation to the recording linear velocity used when the method of recording information to an optical recording medium according to the preferred embodiment is applied, the meritorious effects of the present invention become more marked the faster the recording linear velocity. Specifically, the present invention is particularly effective when this is approximately 16 m/s or greater. Moreover, while there is no particular limitation to the clock period (T) used when applying the method of recording information to an optical recording medium according to the present invention, the meritorious effects of the present invention are more marked the shorter the clock period (T) becomes. Specifically, the present invention is particularly effective when this is approximately 6 ns or less.

As described above, the present invention can provide an optical recording medium, a method of recording information to an optical recording medium and an information recording apparatus that is suited to achieving high data transfer rates.

WORKING EXAMPLE

First, as shown in FIG. 2, an optical recording medium 1—1 having a substrate 11 with a thickness of approximately 1.1 mm, a reflective layer 12 with a thickness of 150 nm, a second dielectric layer 13 with a thickness of 40 nm, a recording layer 14 with a thickness of 15 nm, a first dielectric layer 15 with a thickness of 15 nm, and a light transmission layer 16 with a thickness of approximately 100 μm was prepared.

Such an optical recording medium 1—1 was overwritten 10 times under the conditions illustrated in Table 1 with a mixed signal consisting of recording marks of lengths corresponding to 2T–8T, respectively, on the same track using the pulse train pattern illustrated in Table 2. Various values of the recording power $P_w$ from 4.0 mW to 10.0 mW were used.

TABLE 1

| | |
|---|---|
| Clock frequency | 262.5 MHz |
| Clock period | 3.8 ns |
| Linear velocity | 22.8 m/s |
| Modulation scheme | (1,7) RLL |
| Data transfer rate | 175 Mbps |
| Format efficiency | 80% |
| Data transfer rate (taking efficiency into account) | 140 Mbps |

TABLE 2

| Recording mark | Number of pulses | $T_{top}$ | $T_{off-1}$ | $T_{mp-1}$ | $T_{off-2}$ | $T_{mp-2}$ | $T_{off-3}$ | $T_{last}$ | $T_{cl}$ |
|---|---|---|---|---|---|---|---|---|---|
| 2 T | 1 | 0.6 T | — | — | — | — | — | — | 0.7 T |
| 3 T | 1 | 1.3 T | — | — | — | — | — | — | 0.7 T |
| 4 T | 2 | 1.0 T | 1.0 T | — | — | — | — | 0.7 T | 0.7 T |
| 5 T | 2 | 1.0 T | 1.0 T | — | — | — | — | 1.3 T | 0.7 T |
| 6 T | 3 | 1.0 T | 1.0 T | 1.0 T | 1.0 T | — | — | 0.7 T | 0.7 T |
| 7 T | 3 | 1.0 T | 1.0 T | 1.0 T | 1.0 T | — | — | 1.3 T | 0.7 T |
| 8 T | 4 | 1.0 T | 1.0 T | 1.0 T | 1.0 T | 1.0 T | 1.0 T | 0.7 T | 0.7 T |

As shown in Table 2, the strategy used in the recording of data to optical recording medium 1—1 is the same as the strategy described above with reference to FIGS. 3–9, where, in the formation of all recording marks in which a number of pulses equal to 2 or more is used (4T–8T), the pulse interval ($T_{off}$) is set to be constant (~1.0T). In addition, in the formation of all recording marks (2T–8T), the cooling interval ($T_{cl}$) is set to be constant (~0.7T). Furthermore, among the recording marks wherein the number of pulses used is 2 or greater (5T and 7T), the pulse width of the last pulse ($T_{last}$) is set equal to each other (~0.7T) for those recording marks of a length corresponding to even-number multiples of T (4T, 6T and 8T), and the pulse width of the last pulse ($T_{last}$) is set equal to each other (~1.3T) for those recording marks of a length corresponding to odd-number multiples of T (5T and 7T).

Next, an optical recording medium 1-2 with the same structure as optical recording medium 1—1 was prepared and overwritten 10 times under the conditions illustrated in Table 1 with a mixed signal consisting of recording marks of lengths corresponding to 2T–8T, respectively, on the same track using the pulse train pattern illustrated in Table 3. Various values of the recording power $P_w$ from 4.0 mW to 10.0 mW were used.

TABLE 3

| Recording mark | Number of pulses | $T_{top}$ | $T_{off-1}$ | $T_{mp-1}$ | $T_{off-2}$ | $T_{mp-2}$ | $T_{off-3}$ | $T_{last}$ | $T_{cl}$ |
|---|---|---|---|---|---|---|---|---|---|
| 2 T | 1 | 0.9 T | — | — | — | — | — | — | 0.4 T |
| 3 T | 1 | 1.2 T | — | — | — | — | — | — | 1.0 T |
| 4 T | 2 | 1.0 T | 1.0 T | — | — | — | — | 1.1 T | 0.4 T |
| 5 T | 2 | 1.0 T | 1.5 T | — | — | — | — | 1.4 T | 0.4 T |
| 6 T | 3 | 1.0 T | 0.9 T | 1.1 T | 0.9 T | — | — | 1.1 T | 0.4 T |
| 7 T | 3 | 1.0 T | 1.3 T | 1.1 T | 1.3 T | — | — | 1.1 T | 0.4 T |
| 8 T | 4 | 1.0 T | 0.9 T | 1.1 T | 0.9 T | 1.1 T | 0.9 T | 1.1 T | 0.4 T |

As shown in Table 3, the strategy used in the recording of data to optical recording medium 1–2 is such that, in the formation of all recording marks in which a number of pulses equal to 2 or more is used (4T–8T), the pulse interval ($T_{off}$) is different for each mark. In addition, in the formation of all recording marks (2T–8T), the cooling interval ($T_{cl}$) is not set to be constant. Furthermore, among the recording marks wherein the number of pulses used is 2 or greater (5T and 7T), the pulse width of the last pulse ($T_{last}$) is different for each mark.

The clock jitter in the mixed signals recorded on optical recording medium 1—1 and optical recording medium 1–2 was measured using a time interval analyzer for each recording power used.

FIG. 10 shows the results of measurement.

As shown in FIG. 10, the jitter in optical recording medium 1—1 was lower than the jitter in optical recording medium 1–2 over the entire range of the recording power $P_w$ (4.0 mW through 10.0 mW). In other words, this confirms that power margin is wider when using the pulse train pattern shown in Table 2 than when using the pulse train pattern shown in Table 3.

The invention claimed is:

1. An optical recording medium where information is recorded by forming a plurality of recording marks selected from a group consisting of several types of recording marks each with different lengths, wherein: the optical recording medium comprises setting information required to perform the recording of a first recording mark and a second recording mark contained within said group with the number of pulses and the pulse spacing in the laser beam set substantially equal to each other.

2. An optical recording medium where information is recorded by forming a plurality of recording marks selected from a group consisting of several types of recording marks each with different lengths, wherein: the optical recording medium comprises setting information required to form a first recording mark and a second recording mark contained within said group using a laser beam consisting of the same number of pulses, and to set the cooling interval substantially constant in the formation of all recording marks contained within said group.

3. An optical recording medium where information is recorded by forming a plurality of recording marks selected from a group consisting of several types of recording marks each with different lengths, wherein: in the case that a first recording mark contained within said group and a second recording mark contained within said group are recording marks that have lengths adjacent to each other within said group, and said second recording mark and a third recording mark contained within said group are recording marks that have lengths adjacent to each other within said group, the optical recording medium comprises setting information required to make the pulse width of the first pulse of the laser beam used to form said first recording mark, the pulse width of the first pulse of the laser beam used to form said second recording mark, and the pulse width of the first pulse of the laser beam used to form said third recording mark different from each other.

4. An optical recording medium where information is recorded by forming a plurality of recording marks selected from a group consisting of several types of recording marks each with different lengths, wherein: the optical recording medium comprises setting information required to make the pulse width of the first pulse of the laser beam used to form said first recording mark, and the pulse width of the first pulse of the laser beam used to form said second recording mark different from each other, and to set the cooling interval for forming said first recording mark and the cooling interval for forming said second recording mark substantially equal to each other.

5. An optical recording medium where information is recorded by forming a plurality of recording marks selected from a group consisting of several types of recording marks each with different lengths, wherein: the optical recording medium comprises setting information required to make the pulse width of the last pulse of the laser beam used to form each of the recording marks contained in said group each different from the pulse width of the last pulse of the laser beam used to form recording marks that have lengths adjacent to each other within said group.

6. A method of recording information to an optical recording medium where information is recorded by forming on the optical recording medium a plurality of recording marks selected from a group consisting of several types of recording marks each with different lengths, wherein: the method of recording information to an optical recording medium comprises a step of forming a first recording mark and a second recording mark contained within said group with the number of pulses and the pulse spacing in the laser beam set substantially equal to each other.

7. A method of recording information to an optical recording medium in accordance with claim 6, wherein said first recording mark and said second recording mark are recording marks that have lengths adjacent to each other within said group.

8. A method of recording information to an optical recording medium in accordance with claim 7, wherein the difference in length between said first recording mark and said second recording mark corresponds to the clock period.

9. A method of recording information to an optical recording medium in accordance with claim 8, wherein said number of pulses is 2.

10. A method of recording information to an optical recording medium in accordance with claim 8, wherein said clock period is 6 ns or less.

11. A method of recording information to an optical recording medium in accordance with claim 6, comprising a step of forming a third recording mark and a fourth recording mark contained within said group using a laser beam consisting of a number of pulses that is different from said number of pulses, being a number of pulses that is same as each other, with the pulse spacing in each set substantially equal to the pulse spacing at the time of formation of said first and second recording marks.

12. A method of recording information to an optical recording medium in accordance with claim 11, wherein said number of pulses is 3.

13. A method of recording information to an optical recording medium in accordance with claim 12, wherein said second recording mark and said third recording mark are recording marks that have lengths adjacent to each other within said group.

14. A method of recording information to an optical recording medium in accordance with claim 6, wherein the pulse spacing is set to essentially constant in the formation of all recording marks in which a number of pulses equal to 2 or more is used.

15. A method of recording information to an optical recording medium in accordance with claim 6, wherein the cooling interval is set to essentially constant in the formation of all recording marks.

16. A method of recording information to an optical recording medium in accordance with claim 6, wherein the recording linear velocity of said laser beam is 16 m/s or greater.

17. A method of recording information to an optical recording medium where information is recorded by forming on the optical recording medium a plurality of recording marks selected from a group consisting of several types of recording marks each with different lengths, wherein: the method of recording information to an optical recording medium comprises a step of forming a first recording mark and a second recording mark contained within said group using a laser beam consisting of the same number of pulses, and a step of setting the cooling interval substantially constant in the formation of all recording marks contained within said group.

18. A method of recording information to an optical recording medium where information is recorded by forming on the optical recording medium a plurality of recording marks selected from a group consisting of several types of recording marks each with different lengths, wherein: the method of recording information to an optical recording medium is such that the pulse width of the first pulse of the laser beam used to form a first recording mark contained within said group, the pulse width of the first pulse of the laser beam used to form a second recording mark contained within said group, and the pulse width of the first pulse of the laser beam used to form a third recording mark contained within said group are different from each other, and moreover, said first recording mark and said second recording mark are recording marks that have lengths adjacent to each other within said group, and said second recording mark and said third recording mark are recording marks that have lengths adjacent to each other within said group.

19. A method of recording information to an optical recording medium in accordance with claim 18, wherein the number of pulses in said laser beam used to form said first recording mark and the number of pulses in said laser beam used to form said second recording mark are equal to each other.

20. A method of recording information to an optical recording medium in accordance with claim 19, wherein the number of pulses in said laser beam used to form said second recording mark and the number of pulses in said laser beam used to form said third recording mark are different from each other.

21. A method of recording information to an optical recording medium where information is recorded by forming on the optical recording medium a plurality of recording marks selected from a group consisting of several types of recording marks each with different lengths, wherein: the method of recording information to an optical recording medium is such that the pulse width of the first pulse of the laser beam used to form a first recording mark contained within said group, and the pulse width of the first pulse of the laser beam used to form a second recording mark contained within said group are different from each other, and, the cooling interval for forming said first recording mark and the cooling interval for forming said second recording mark are substantially equal to each other.

22. A method of recording information to an optical recording medium in accordance with claim 21, wherein the number of pulses in said laser beam used to form said first recording mark and the number of pulses in said laser beam used to form said second recording mark are different from each other.

23. A method of recording information to an optical recording medium in accordance with claim 22, wherein the cooling interval is set substantially constant in the formation of all recording marks contained within said group.

24. A method of recording information to an optical recording medium where information is recorded by forming on the optical recording medium a plurality of recording marks selected from a group consisting of several types of recording marks each with different lengths, wherein: the method of recording information to an optical recording medium is such that the pulse width of the last pulse of the laser beam used to form each of the recording marks contained in said group is each different from the pulse width of the last pulse of the laser beam used to form recording marks that have lengths adjacent to each other within said group.

25. A method of recording information to an optical recording medium in accordance with claim 24, wherein the pulse spacing is set to essentially constant in the formation of all recording marks in which a number of pulses equal to 2 or more is used.

26. An information recording apparatus that records information by forming on an optical recording medium a plurality of recording marks selected from a group consisting of several types of recording marks each with different lengths, wherein: the information recording apparatus comprises means of forming a first recording mark and a second recording mark contained within said group with the number of pulses and the pulse spacing in the laser beam set substantially equal to each other.

27. An optical recording medium where information is recorded by forming a plurality of recording marks selected from a group consisting of several types of recording marks each with different lengths correspond to an integral multiple of a clock period, wherein: the optical recording medium comprises setting information required to form recording marks of a length corresponding to even-number multiples of said clock period using a laser beam consisting of a number of pulses equal to the quotient obtained upon dividing the respective multiples by 2, to form recording marks of a length corresponding to odd-number multiples of said clock period using a laser beam consisting of a number of pulses equal to the quotient obtained upon dividing by 2 a value obtained by adding 1 to, or a value obtained by subtracting 1 from the respective multiples, and moreover, to set the pulse spacing at the time of forming recording marks formed using a stipulated number of pulses substantially equal to the pulse spacing at the time of forming other recording marks formed using said stipulated number of pulses.

28. An optical recording medium in accordance with claim 27, wherein said information contains information required to set the pulse spacing essentially constant in the formation of all recording marks in which a number of pulses equal to 2 or more is used.

29. An optical recording medium in accordance with claim 27, wherein said information contains information required to set the cooling interval essentially constant in the formation of all recording marks.

30. An optical recording medium in accordance with claim 27, wherein said information contains information required to, for recording marks formed using a number of pulses equal to 2 or greater, set the pulse width of the last pulse equal to each other for each recording mark of a length corresponding to even-number multiples of said clock period, and set the pulse width of the last pulse equal to each other for each recording mark of a length corresponding to odd-number multiples of said clock period.

31. A method of recording information to an optical recording medium where information is recorded by forming on the optical recording medium a plurality of recording marks selected from a group consisting of several types of recording marks each with different lengths corresponding to an integral multiple of a clock period, wherein: the method of recording information to an optical recording medium comprises a step of forming recording marks of a length corresponding to even-number multiples of said clock period using a laser beam consisting of a number of pulses equal to the quotient obtained upon dividing the respective multiples by 2, a step of forming recording marks of a length corresponding to odd-number multiples of said clock period using a laser beam consisting of a number of pulses equal to the quotient obtained upon dividing by 2 a value obtained by adding 1 to, or a value obtained by subtracting 1 from the respective multiples, and moreover, a step of setting the pulse spacing at the time of forming recording marks formed using a stipulated number of pulses substantially equal to the pulse spacing at the time of forming other recording marks formed using said stipulated number of pulses.

32. A method of recording information to an optical recording medium in accordance with claim 31, wherein the pulse spacing is set essentially constant in the formation of all recording marks in which a number of pulses equal to 2 or more is used.

33. A method of recording information to an optical recording medium in accordance with claim 31, wherein the cooling interval is set essentially constant in the formation of all recording marks.

34. A method of recording information to an optical recording medium in accordance with claim 31, wherein, regarding recording marks formed using a number of pulses equal to 2 or greater, the pulse width of the last pulse is set equal to each other for each recording mark of a length corresponding to even-number multiples of said clock period, and the pulse width of the last pulse is set equal to each other for each recording mark of a length corresponding to odd-number multiples of said clock period.

35. A method of recording information to an optical recording medium in accordance with claim 31, wherein said recording marks are formed with the data transfer rate set to 100–200 Mbps.

36. A method of recording information to an optical recording medium in accordance with claim 35, wherein said recording marks are formed with the data transfer rate set to approximately 140 Mbps.

37. A method of recording information to an optical recording medium where information is recorded by forming on the optical recording medium a plurality of recording marks selected from a group consisting of several types of recording marks each with different lengths corresponding to an integral multiple of a clock period, wherein: the method of recording information to an optical recording medium comprises a step of forming recording marks of a length corresponding to even-number multiples of said clock period using a laser beam consisting of a number of pulses equal to the quotient obtained upon dividing the respective multiples by 2, a step of forming recording marks of a length corresponding to odd-number multiples of said clock period using a laser beam consisting of a number of pulses equal to the quotient obtained upon dividing by 2 a value obtained by adding 1 to, or a value obtained by subtracting 1 from the respective multiples, and moreover, a step of setting the cooling interval substantially constant in the formation of all recording marks.

38. A method of recording information to an optical recording medium where information is recorded by forming on the optical recording medium a plurality of recording marks selected from a group consisting of several types of recording marks each with different lengths corresponding to an integral multiple of a clock period, wherein: the method of recording information to an optical recording medium comprises a step of forming recording marks of a length corresponding to even-number multiples of said clock period using a laser beam consisting of a number of pulses equal to the quotient obtained upon dividing the respective multiples by 2, a step of forming recording marks of a length corresponding to odd-number multiples of said clock period using a laser beam consisting of a number of pulses equal to the quotient obtained upon dividing by 2 a value obtained by adding 1 to, or a value obtained by subtracting 1 from the respective multiples, and moreover, a step of, regarding recording marks formed using a number of pulses equal to 2 or greater, setting the pulse width of the last pulse equal to each other for each recording mark of a length corresponding to even-number multiples of said clock period, and setting the pulse width of the last pulse equal to each other for each recording mark of a length corresponding to odd-number multiples of said clock period.

39. An information recording apparatus that records information by forming on the optical recording medium a plurality of recording marks selected from a group consisting of several types of recording marks each with different lengths corresponding to an integral multiple of a clock period, wherein: the information recording apparatus comprises means of forming recording marks of a length corresponding to even-number multiples of said clock period using a laser beam consisting of a number of pulses equal to the quotient obtained upon dividing the respective multiples by 2, means of forming recording marks of a length corresponding to odd-number multiples of said clock period using a laser beam consisting of a number of pulses equal to the quotient obtained upon dividing by 2 a value obtained by adding 1 to, or a value obtained by subtracting 1 from the respective multiples, and moreover, means of setting the pulse spacing at the time of forming recording marks formed using a stipulated number of pulses substantially equal to the pulse spacing at the time of forming other recording marks formed using said stipulated number of pulses.

* * * * *